(12) United States Patent
Reutova et al.

(10) Patent No.: US 11,588,689 B1
(45) Date of Patent: Feb. 21, 2023

(54) MIGRATING SOFTWARE DEFINED NETWORK

(71) Applicant: VMware, Inc., Palo Alto, CA (US)

(72) Inventors: Valentina Reutova, London (GB);
Petro Rudy, Belmont, MA (US);
Poonam Chugh, Westford, MA (US);
Mukesh Hira, Palo Alto, CA (US);
Vivek Ganesan, San Jose, CA (US);
Ankur Dubey, Santa Clara, CA (US);
Bo Hu, San Mateo, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/592,459

(22) Filed: Feb. 3, 2022

(51) Int. Cl.
*G06F 15/173* (2006.01)
*H04L 41/0813* (2022.01)
*H04L 41/0866* (2022.01)

(52) U.S. Cl.
CPC ...... *H04L 41/0813* (2013.01); *H04L 41/0866* (2013.01)

(58) Field of Classification Search
CPC .................. H04L 41/0813; H04L 41/0866
See application file for complete search history.

(56) References Cited

U.S. PATENT DOCUMENTS

| | | | | |
|---|---|---|---|---|
| 2017/0318098 A1* | 11/2017 | Sanghvi | ............... | H04W 84/18 |
| 2018/0034847 A1 | 2/2018 | Stella | | |
| 2018/0330420 A1* | 11/2018 | Staats | ............... | G06Q 30/0627 |
| 2020/0127907 A1* | 4/2020 | Koo | ............... | H04W 24/04 |
| 2020/0128056 A1* | 4/2020 | Simotas | ............... | H04L 65/611 |
| 2020/0162344 A1 | 5/2020 | Zapponi et al. | | |
| 2021/0092048 A1* | 3/2021 | Dutta | ............... | H04L 45/34 |
| 2021/0216278 A1* | 7/2021 | D'Amato | ............... | G06F 3/165 |
| 2021/0311759 A1* | 10/2021 | Corrie | ............... | G06F 9/45558 |

OTHER PUBLICATIONS

Non-Published Commonly Owned U.S. Appl. No. 17/223,956, filed Apr. 6, 2021, 35 pages, VMware, Inc.
Non-Published Commonly Owned U.S. Appl. No. 17/223,959, filed Apr. 6, 2021, 37 pages, VMware, Inc.
Non-Published Commonly Owned Related U.S. Appl. No. 17/592,451 with similar specification, filed Feb. 3, 2022, 56 pages, VMware, Inc.

\* cited by examiner

*Primary Examiner* — Thanh T Nguyen
(74) *Attorney, Agent, or Firm* — Adeli LLP

(57) ABSTRACT

Some embodiments provide a method of migrating a first software defined (SD) network managed by a first network manager to a second SD network managed by a second network manager. The method of some embodiments is performed by a third network manager that provides an interface that allows a set of users to specify and review logical network components, which the first and second network managers can then respectively deploy in the first and second SD networks. The third network manager in some embodiments identifies for a migration manager a first group of two or more logical network components that the third network manager previously specified for the first network manager to deploy in the first SD network. The migration manager then uses this information to correctly convert the first group of logical network components to a second group of two or more logical components in an appropriate manner that will allow the third network manager to manage the second group of logical network components that is implemented in the second SD network.

20 Claims, 25 Drawing Sheets

*Figure 18*

MIGRATING SOFTWARE DEFINED NETWORK

BACKGROUND

In recent years, there has been a proliferation of deployments in public clouds. These deployments often supplement deployments in private enterprise datacenters. It is quite common today for a corporation to have several private datacenters as well as several deployments in one or more public clouds. Despite the proliferation of private and public clouds, tools for facilitating migration of network components (that connect sets of migrating machines) from one cloud to another have yet to be developed.

BRIEF SUMMARY

Some embodiments provide a method of migrating software-defined (SD) networks from one deployment that is managed by a first network manager (e.g., by a first managing server) to another deployment that is managed by a second network manager (e.g., by a second managing server). In some embodiments, the method migrates a first SD network managed by the first network manager to a second SD network managed by the second network manager. Also, in some embodiments, the first and second network managers respectively deploy first and second sets of network components in the first and second software-defined networks respectively.

The method of some embodiments is performed by a third network manager that provides an interface that allows a set of users to specify and review logical network components, which the first and second network managers can then respectively deploy in the first and second SD networks. This interface in some embodiments includes a graphical user interface (GUI) that provides a view of the logical network components being defined, reviewed, and deployed through the third manager. This interface in some embodiments also includes an application programming interface (API) through which the logical network components can be defined, reviewed, and deployed.

The third network manager in some embodiments receives a notification of the migration of the first SD network to the second SD network. The third manager then identifies a first group of two or more logical network components that the third network manager previously specified for the first network manager to deploy in the first SD network. The third manager provides identifiers identifying the first group of logical network components to a migration manager, which then uses this information to correctly migrate the first SD network to the second SD network. Specifically, the migration manager uses the provided information to convert the first group of logical network components to a second group of two or more logical components in an appropriate manner that will allow the third network manager to manage the second group of logical network components that is implemented in the second SD network.

This is because the third network manager uses different logical component deployments to implement at least one particular logical network component differently in the first and second SD networks. For instance, for the first SD network, the third manager specifies a distributed logical router to connect multiple different subnets, while for the second SD network, the third manager specifies a centralized logical router to connect the different subnets. Providing the identification of the first group of logical network components to the migration manager ensures that the migration manager correctly deploys the particular logical network component, which has different logical component deployments defined by the third network manager for the first and second SD networks.

In some embodiments, the migration manager uses a template that maps (1) a first logical component set that the third network manager defines for a first deployment in which the first SD network is defined, to (2) a second logical component set that the third network manager defines for a second deployment in which the second SD network is defined. In these embodiments, the migration manager uses this template to replace the first logical component set defined for the first deployment of the first SD network with the second logical component set defined for the second deployment of the second SD network.

In some embodiments, the first and second deployments are different clouds, e.g., different public clouds, or a private cloud and a public cloud. In these or other embodiments, the first and second deployments use different network virtualization platforms to define and deploy logical networks. In other embodiments, both the first and second deployments are in the same cloud, but are managed by different network manager clusters.

Once the migration manager has performed this migration, the third network manager (1) receives identification of the second group of logical network components that have been deployed in the second SD network instead of the first group of logical network components, and (2) uses this information to create its network objects (e.g., its data structures) for the second group of logical network components and associates them with the identifiers provided by the migration manager. Once it has created these network objects, the third manager uses these objects to subsequently manage the second group of logical network components.

In some embodiments, the first and second network managers deploy each logical network component by configuring a set of one or more physical network components to perform operations associated with the logical network component. Also, in some embodiments, at least one set of physical network components that is configured for at least one particular logical network component deployed by the first or second network manager includes two or more physical network components that are configured to conjunctively implement the particular logical network component. The first and second network managers in some embodiments configure physical network components by using respectively first and second network controllers that distribute configuration data to the physical network components to configure these physical network components to respectively implement the first and second groups of logical network components.

In some embodiments, the first and second network managers map the logical network components that the third network manager defines to other logical network components defined by the first and second network managers, and then configure physical network components to implement these other logical network components. In some embodiments, the logical network components defined by the first or second network managers can include some or all of the logical network components defined by the third manager, can include logical network component(s) not in the set of logical network components defined by the third manager, and/or can exclude some of the logical network components defined by the third manager.

Also, in some embodiments, the first group of logical network components defined by the first network manager can overlap the second group of logical network components defined by the second network manager in any number of ways. For instance, one set of logical network components can be in both the first and second groups of logical network components, while a second set of logical network components can be in the first or second group of logical network components but not the other group (second or first) of logical network components.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

Figure 18:
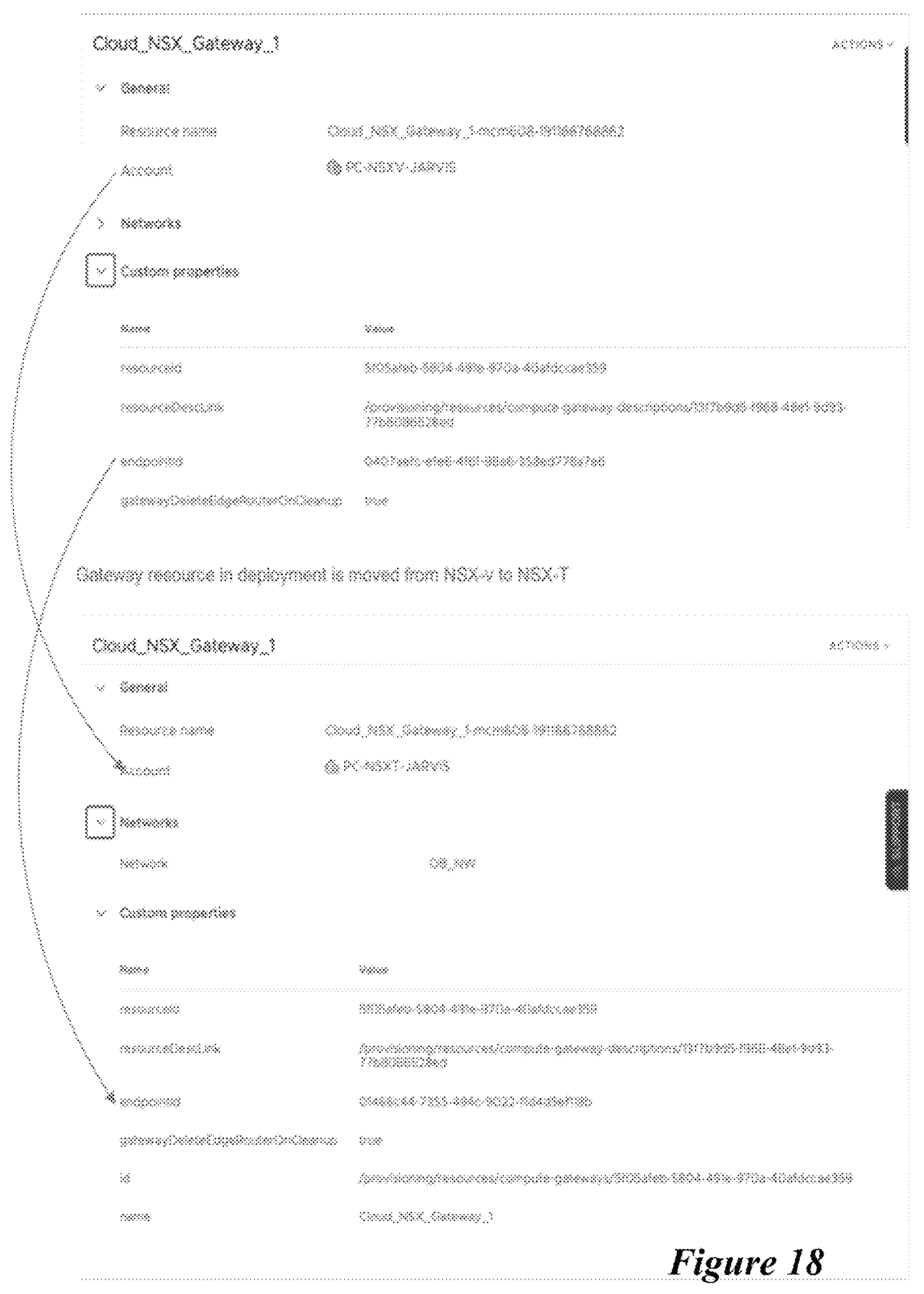

FIGS. 17-22 illustrate examples of the migration wizard of the network automation platform migrate the previous network virtualization cloud accounts and their associated objects in the infrastructure automation platform to the new network virtualization cloud accounts and objects.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of migrating a first software-defined (SD) network from a first deployment that is managed by a first network manager cluster to a second SD network in a second deployment that is managed by a second network manager cluster. The first and second SD networks respectively include first and second sets of network components that are respectively managed by the first and second network manager clusters.

In some embodiments, the first and second deployments are different deployments in different clouds, e.g., in different public clouds, or in a private cloud (e.g., a private on-prem set of one or more datacenters) and a public cloud (e.g., a public set of one or more datacenters). In other embodiments, both the first and second deployments are in the same cloud, but are managed by different network manager clusters. Also, in some embodiments, the first and second network manager clusters use different network management software (e.g., different virtualization platforms) to define and deploy networks components in the first and second SD networks.

Figure 1:
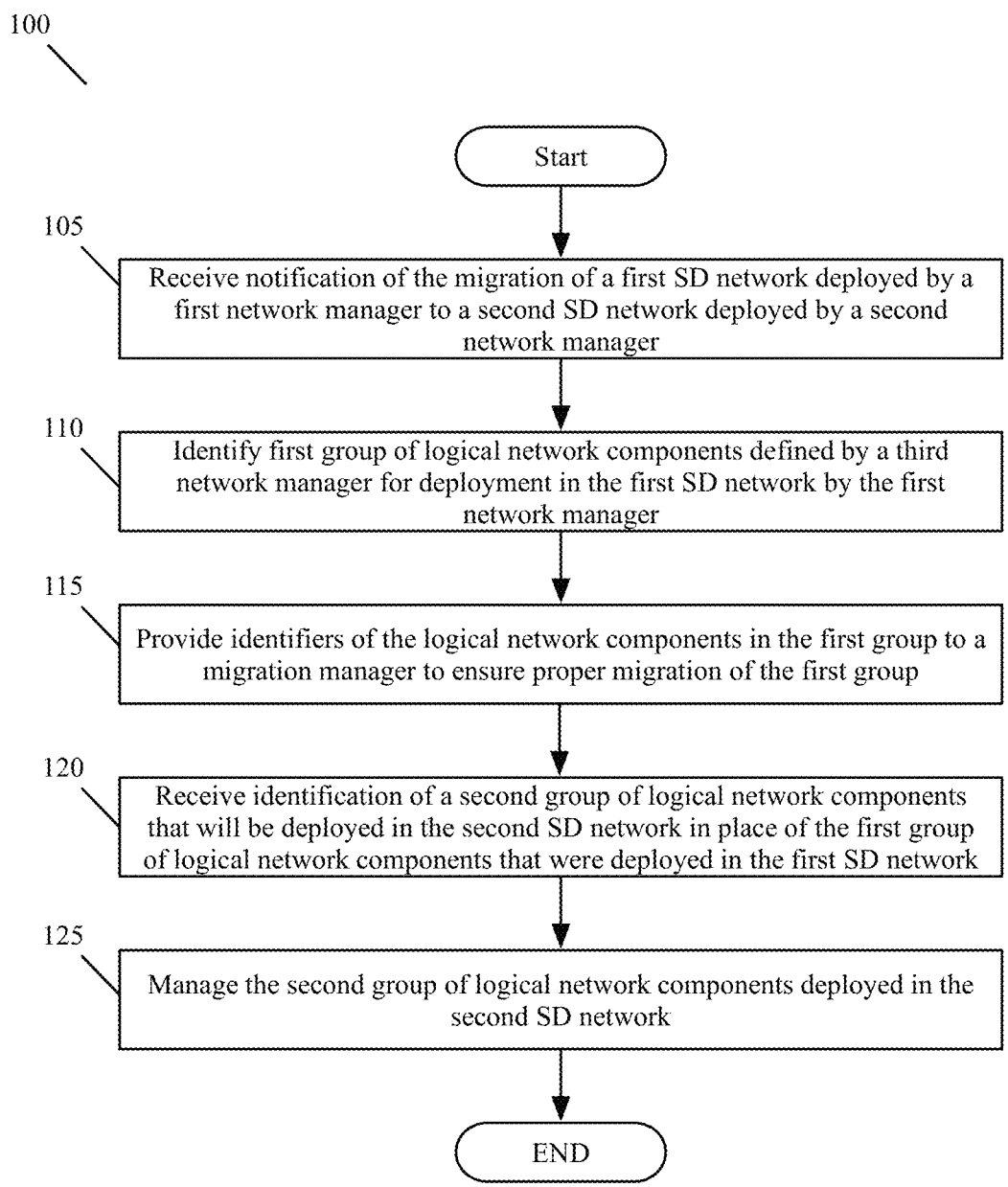
FIG. 1 illustrates a process that implements the method of some embodiments of the invention.

FIG. 1 illustrates a process 100 that implements the method of some embodiments of the invention. This process 100 is performed in some embodiments by a third network manager cluster that provides an interface that allows a set of users to specify and review logical network components, which the first and second network managers can then respectively deploy in the first and second SD networks. This interface in some embodiments includes a graphical user interface (GUI) that provides a view of the logical network components being defined, reviewed, and deployed through the third manager. This interface in some embodiments also includes an application programming interface (API) through which the logical network components can be defined, reviewed, and deployed.

Figure 2:
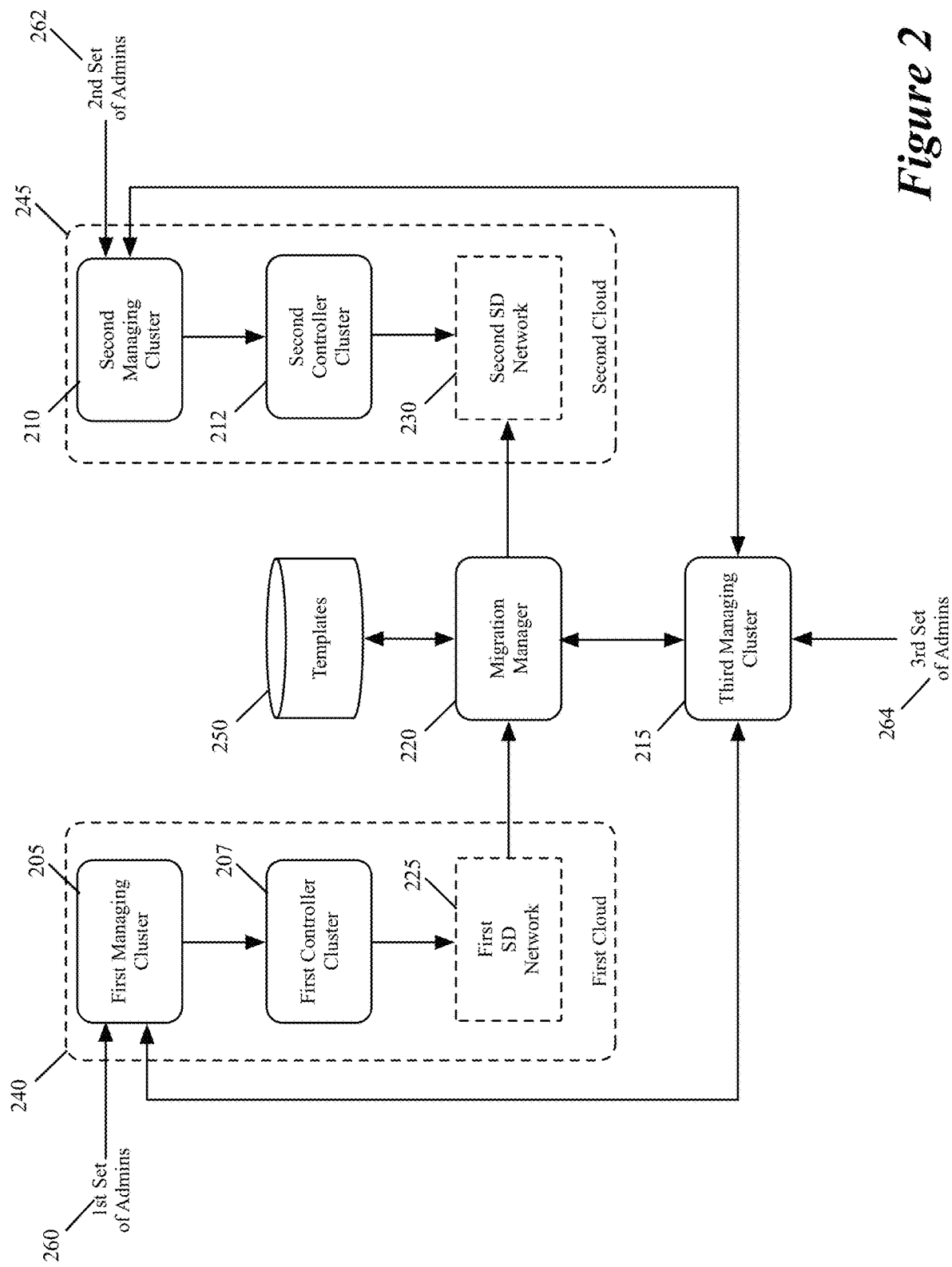
FIG. 2 illustrates an example of first, second and third manager clusters, first and second controller clusters, a migration manager, and first and second SD networks.

The process 100 will be described below by reference to FIG. 2, which illustrates the first, second and third manager clusters 205, 210 and 215, first and second controller clusters 207 and 212, a migration manager 220, and first and second SD networks 225 and 230. In the example illustrated in FIG. 2, the first SD network 225, the first manager cluster 205 and the first controller cluster 207 are in a first cloud 240, while the second SD network 230, the second manager cluster 210, and the second controller cluster 212 are in a second cloud 245. In some embodiments, the first and second clouds are respectively a private cloud deployment and a public cloud deployment. In other embodiments, both clouds are public clouds (e.g., are public clouds of different public cloud providers), while in still other embodiments they are both private clouds (e.g., are different private datacenters of one enterprise).

In some embodiments, the manager cluster and/or controller cluster can be in a different cloud than the SD network that they manage and/or configure. Also, in some embodiments, the third managing cluster and/or migration manager are in one of the clouds 240 or 245, or are in another private or public cloud. The migration manager in some embodiments is a process that runs within the first managing cluster 205, the second managing cluster 210 or both managing clusters 205 or 210. As shown, three sets of administrators 260, 262 and 264 interface with the three different management clusters 205, 210 and 215 in some embodiments. These sets of administrators are mutually exclusive (i.e., no one administrator is in both sets) in some cases, while in other cases two or three of the administrator sets overlap (i.e., have at least one common network administrator).

Through the interface (e.g., GUI or API) of the third manager cluster 215, the third network administrator set can specify and review logical network components to deploy in either the first or second SD networks. The third manager cluster 215 directs the first or second manager cluster 205 or 210 to configure network components in the first or second cloud deployment 240 or 245 in order to deploy the logical network components specified by the third network administrator set 264. In some embodiments, the first and second manager clusters 205 and 210 configure network components in the first and second cloud deployments 240 and 245 in order to deploy network components specified by the first and second sets of administrators 260 and 262 respectively.

In some embodiments, the first and second network managers deploy each logical network component by configuring a set of one or more physical network components to perform operations associated with the logical network component. Also, in some embodiments, at least one set of physical network components that is configured for at least one particular logical network component deployed by the first or second network manager includes two or more physical network components that are configured to conjunctively implement the particular logical network component.

The first and second network managers in some embodiments configure physical network components by using respectively first and second network controller clusters 207 and 212 that generate and distribute configuration data to the physical network components to configure these physical network components to respectively implement the first and second groups of logical network components. In some embodiments, each logical network component in a subset of one or more logical network components defined by the first, second or third manager clusters, is implemented by two or more physical network components that are configured to perform the operation of the logical network component, as mentioned above. Methods for configuring multiple physical forwarding elements to implement one logical forwarding element (e.g., a logical switch, a logical router, a logical gateway) are further described in U.S. Pat. No. 9,787,605 and U.S. Patent Publication 2021/0314192, which are incorporated herein by reference.

In some embodiments, the first and second network managers map the logical network components that the third network manager defines to other logical network components defined by the first and second network managers, and then configure physical network components to implement these other logical network components. In some embodiments, the logical network components defined by the first or second network managers can include some or all of the logical network components defined by the third manager, can include logical network component(s) not in the set of logical network components defined by the third manager, and/or can exclude some of the logical network components defined by the third manager.

Figure 3:
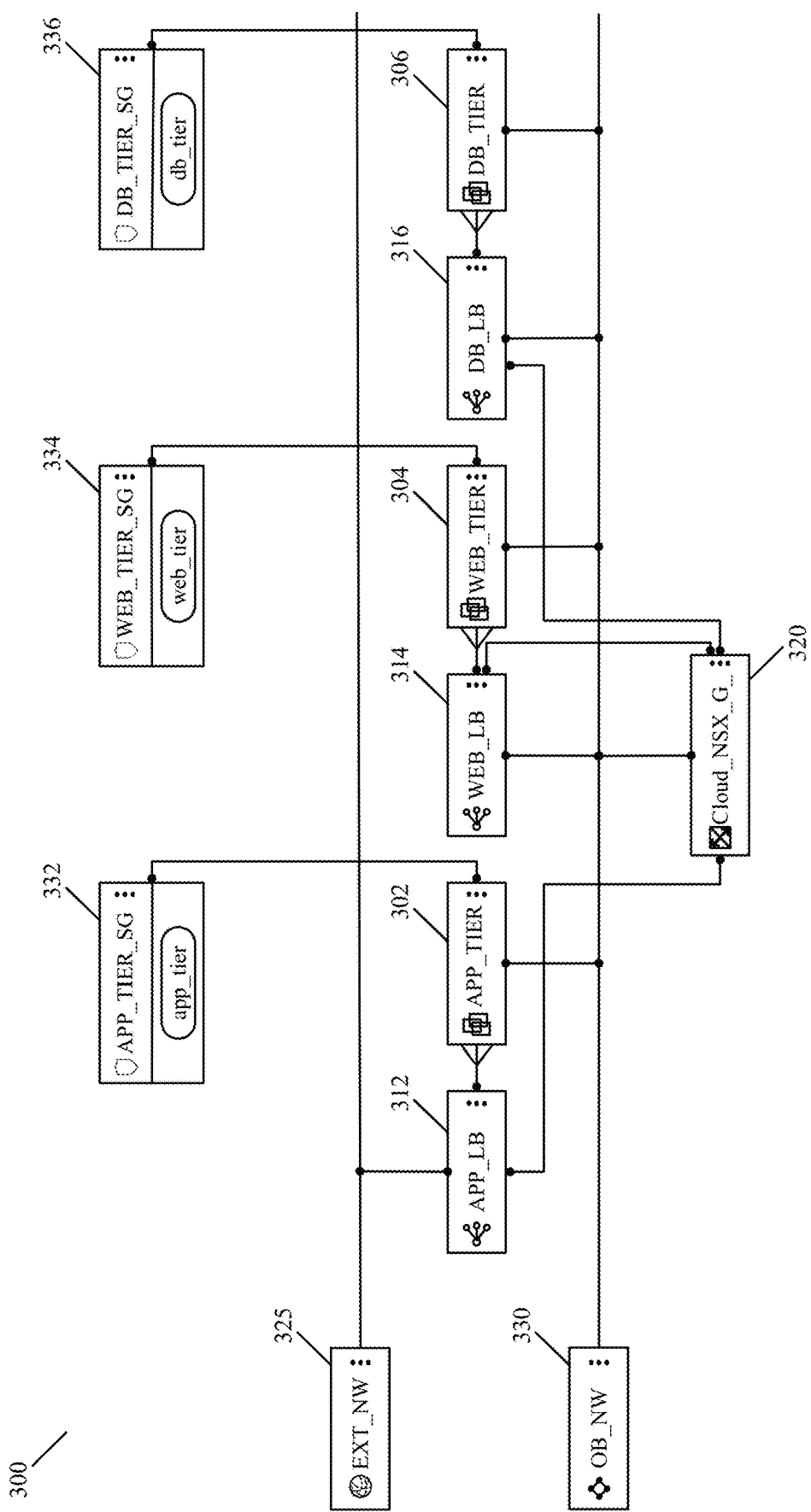
FIG. 3 illustrates an example of a first group of logical network components specified by the third manager cluster.
Figure 4:
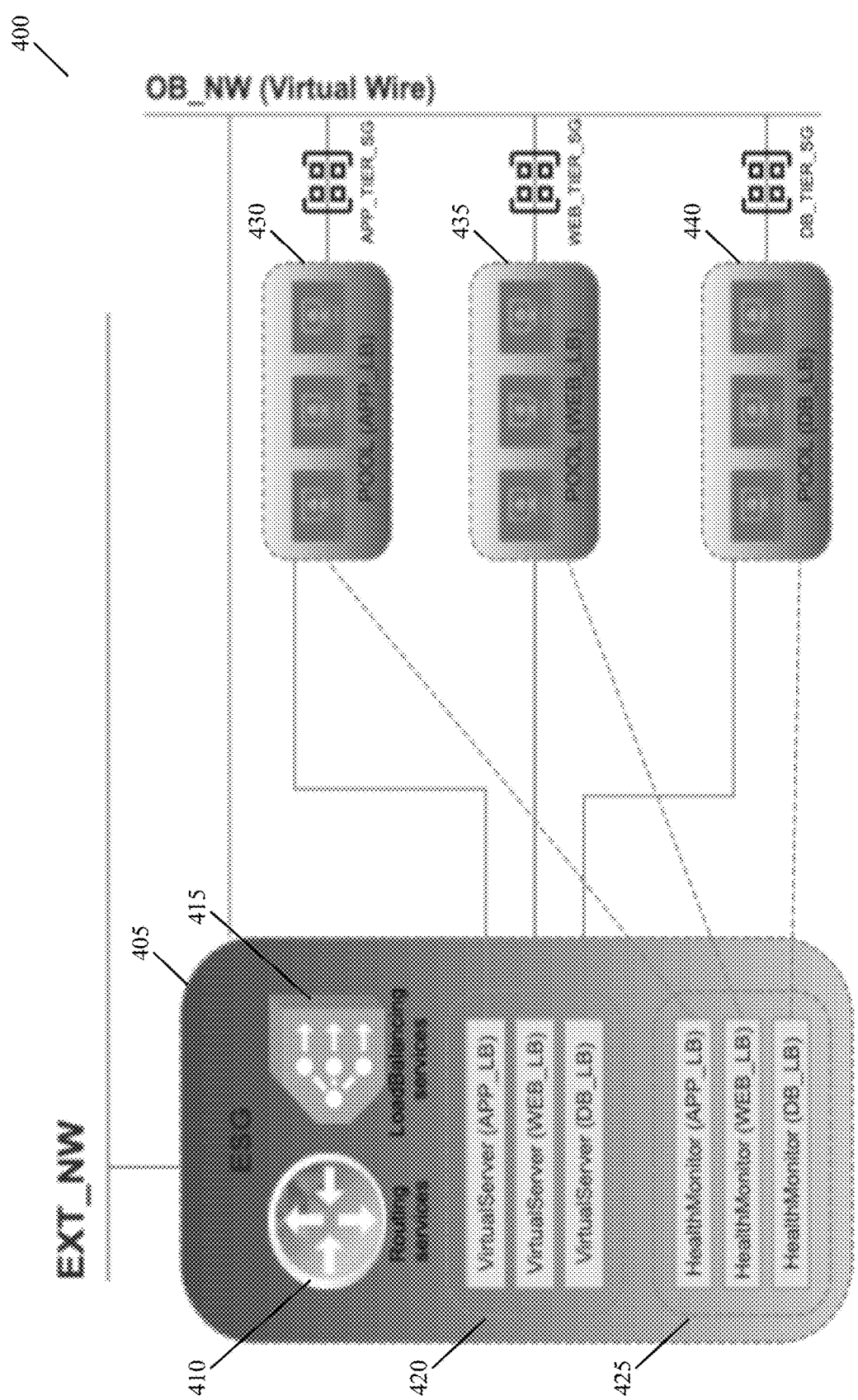
FIGS. 4-5 illustrate examples of second and third groups of logical network components that the first and second managing clusters would define to implement the first group of logical network components.
Figure 5:
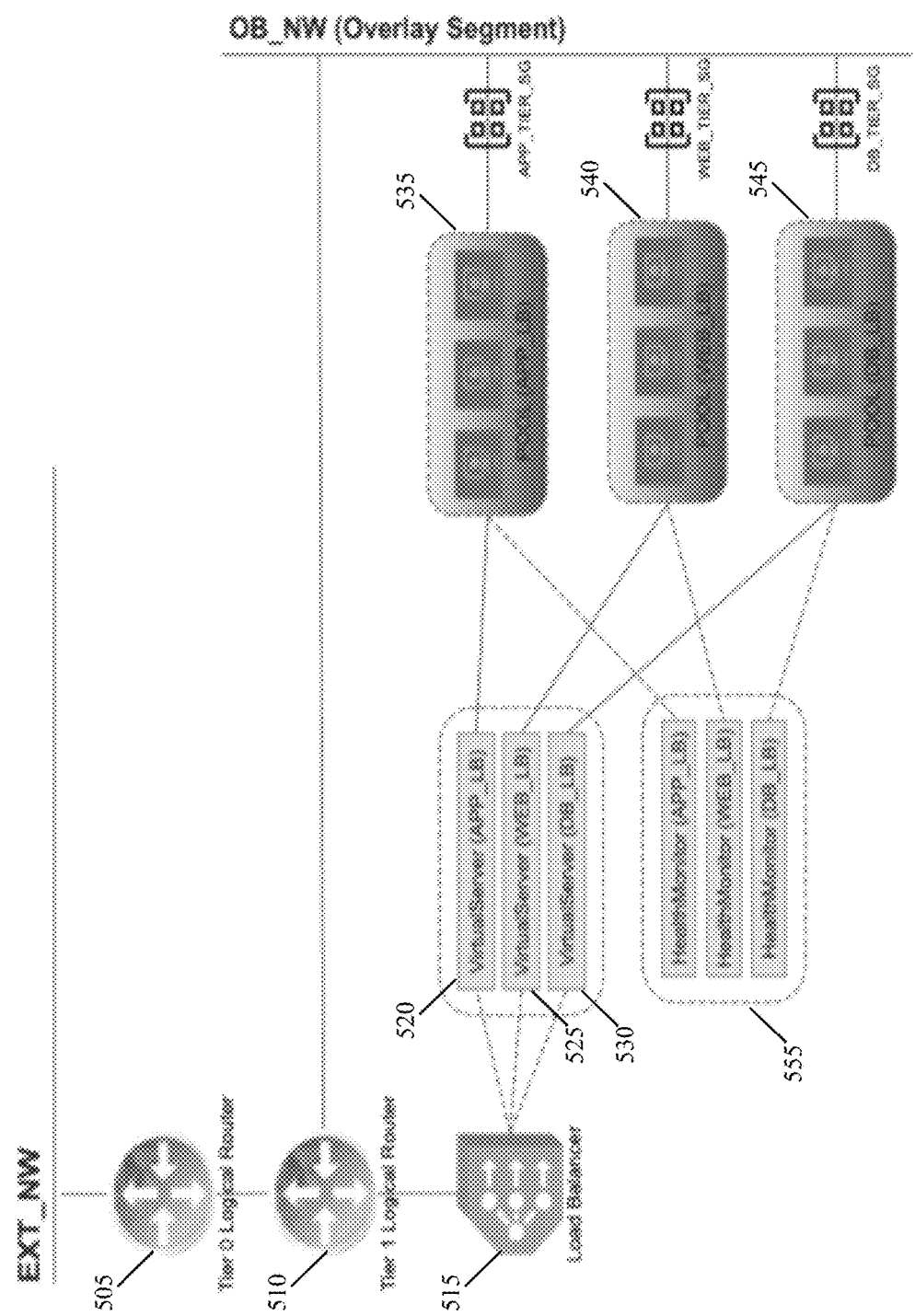

FIG. 3 illustrates an example of a first group of logical network components 300 specified by the third manager cluster 215, while FIGS. 4 and 5 illustrate examples of second and third groups of logical network components 400 and 500 that the first and second managing clusters 205 and 210 would define to implement the first group of logical network components 300. The first managing cluster 205 has the first controller cluster 207 configure a set of physical network components in the first cloud 240 to implement the second group of logical network components 400, while the second manager cluster 210 has the second controller cluster 212 configure another set of physical network components in the second cloud 245 to implement the third group of logical network components 500.

FIG. 3 illustrates a three-tier application that is specified through the third manager cluster 215, which provides an infrastructure automation platform in some embodiments. The three-tier application includes an application server tier 302, a web server tier 304, and a database (DB) server tier 306. Before each of these tiers is a load balancing tier 312, 314 and 316. Each load balancing tier connects to a cloud gateway 320. The set of app-tier load balancers 312 also connect to an external network 325, while the other two sets of load balancers 314 and 316 connect to an internal network 330. Also, each of the app, web and DB tiers 302, 304 and 306 is respectively part of an app-tier security group 332, web-tier security group 334, and a DB-tier security group 336.

FIG. 4 illustrates a second group of logical network components 400 that in a first deployment environment implements the first group of logical network components 300 that form the three-tier application of FIG. 3. The second group of logical network components includes an external service gateway 405 that provides routing services 410 and load balancing services 415. The uplink port of the gateway 405 in some embodiments connects to the external network.

This gateway also includes (1) three sets of virtual servers 420 that provide app, web and DB load balancing services, and (2) health monitoring servers 425 that monitor the health of three pools of servers 430, 435 and 440, which respectively include the app server machines, the web server machines and the database server machines. The second group of logical network components are managed and deployed by the first manager cluster 205 in some embodiments.

FIG. 5 illustrates a third group of logical network components 500 that in a second deployment environment implements the first group of logical network components 300 of FIG. 3. The third group of logical network components includes two tiers of logical routers 505 and 510, a separate load balancer 515 that includes three pools 520, 525 and 530 of load balancing virtual servers for the app, web and DB pools of machines 535, 540 and 545, and a separate set of health monitoring servers 555 for each of the different pools of machines. The third group of logical network components are managed and deployed by the second manager cluster 210 in some embodiments. The third group of logical network components differs from the second group in several ways. For instance, it does not have an external service gateway that subsumes many of the functionalities. Instead, it has separate load balancers, and health monitoring servers. Also, it has a tier 1 logical router that connects to the external network through a tier 0 logical router.

As mentioned above, the third manager cluster 215 performs the process 100 of FIG. 1 each time a first SD network is being migrated from a first deployment managed by the first manager cluster 205 to a second SD network in a second deployment managed by the second manager cluster 210. For instance, when the machines implementing the three-tier application of FIG. 3 are migrating from a first deployment managed by the first network manager to a second deployment managed by the second network manager, the third manager cluster 215 would perform the process 100 to identify the first group of logical network components 300 to the migration manager. The migration manager would then ensure that the second group of logical network components 400 of FIG. 4 that were previously implementing the first group of logical network components 300 in the first deployment is correctly replaced by the third group of logical network components 500 of FIG. 5 in the second deployment.

As shown, the third manager cluster 215 receives (at 105) a notification of the migration of the first SD network to the second SD network. The third manager cluster receives this notification from one of its administrators in some embodiments, while in other embodiments it receives this notification from a first-set or second-set administrator 260 or 262 through their respective manager clusters 205 or 210.

At 110, the third manager identifies a first group of two or more logical network components that the third manager cluster previously specified for the first manager cluster to deploy in the first SD network. The third manager provides (at 115) identifiers identifying the first group of logical network components to the migration manager 220. The migration manager uses this information to correctly migrate the first SD network to the second SD network. Specifically, the migration manager 220 uses the provided information to convert the first group of logical network components to a second group of logical network components in an appropriate manner that will allow the third manager cluster 215 to manage the second group of logical network components that is implemented in the second SD network.

As mentioned above by reference to FIGS. 4 and 5, the third manager cluster uses different logical component deployments to implement some logical network component differently in the first and second SD networks. For instance, for the first SD network, the third manager specifies a distributed logical router to connect multiple different subnets, while for the second SD network, the third manager specifies a centralized logical router to connect the different subnets. Providing (at 115) the identification of the first group of logical network components to the migration manager ensures that the migration manager correctly deploys the particular logical network component, which has different logical component deployments defined by the third manager cluster for the first and second SD networks.

In some embodiments, the migration manager uses templates stored in a template storage 250 to map (1) logical component deployments that the third manager cluster defines for a first environment in which the first SD network is defined, to (2) logical component deployments that the third manager cluster defines for a second environment in which the second SD network is defined. As mentioned above, the first and second clouds are different public clouds in some embodiments, or a private cloud and a public cloud in other embodiments. In these embodiments, the first and second managing clusters 205 and 210 use different network virtualization software to define and deploy logical networks.

In some embodiments, the migration manager uses one such template to replace a first logical component deployment defined for the first SD network 225 in the first cloud 240 with a second logical component deployment defined for the second SD network 230 in the second cloud 245. Also, in some embodiments, the logical network components defined by the first or second manager clusters can include some or all of the logical network components defined by the third manager, can include logical network component(s) not in the set of logical network components defined by the third manager, and/or can exclude some of the logical network components defined by the third manager.

Also, in some embodiments, the first group of logical network components defined by the first manager cluster can overlap the second group of logical network components defined by the second manager cluster in any number of ways. For instance, one set of logical network components can be in both the first and second groups of logical network components, while a second set of logical network components can be in the first or second group of logical network components but not the other group (second or first) of logical network components.

Once the migration manager has performed its migration operations, the third manager cluster receives (at 120) identification of the second group of logical network components that have been deployed in the second SD network instead of the first group of logical network components. The third manager cluster then (at 125) uses this information to create its network objects (e.g., its data structures) for the second group of logical network components and associates them with the identifiers provided by the migration manager. Once it has created these network objects, the third manager uses these objects to subsequently manage the second group of logical network components.

More detailed examples of the migration process of some embodiments will be described now. In these examples, the first and second network manager clusters are the NSX-V and NSX-T managers of VMware, Inc. These network manager clusters serve as two different network virtualization platforms for different virtualized environments in some embodiments. The third manager cluster in these examples is an infrastructure automation platform, such as vRealize Automation of VMware, Inc.

In some embodiments, the infrastructure automation platform has a migration assistant that is available for migrating NSX-V cloud accounts and their related objects to NSX-T. The migration assistant in some embodiments enables a user to take advantage of the NSX-T data center migration coordinator from within the constructs of the infrastructure automation platform. While the migration process is primarily run in the infrastructure automation platform, there are several interconnected actions within the process that involve both the infrastructure automation platform administrator and the network virtualization administrator to work together to share information.

In some embodiments, the migration assistant of the infrastructure automation platform is a prescriptive migration assistant that allows the user to migrate an NSX Data Center for vSphere to an NSX-T Data Center. The migration assistant includes a getting started page and sequential migration plan pages. In some embodiments, each source network virtualization cloud account requires a separate migration plan to be set up in the migration assistant of the infrastructure automation platform. By migrating the user's previous NSX-V cloud accounts and their related objects to the NSX-T, the user is able to take advantage of the features and functions of NSX-T and as integrated within the infrastructure automation platform.

While the user works with the migration plan in the infrastructure automation platform, there is a point in the process where the infrastructure automation platform administrator and the network virtualization administrator must share files with one another as input to, and output from, the NSX-T data center migration coordinator utility. As further described below, the migration plan on-screen help informs the user when the user and the network virtualization administrator need to communicate with one another to share the needed files.

Some embodiments described below provide a method for managing the migration of the first SD network to the second software-defined network that is performed by the infrastructure automation manager. This manager collects information to allow a first network administrator interfacing with the NSX-V or NSX-T manager, and a second network administrator interfacing with the infrastructure automation manager, to review in order to assess whether any issue needs resolution before the migration. The collected information is provided to the NSX-V or NSX-T manager for presentation to the first network administrator. This method commences the migration only after the first and second administrators have assessed the collected information and confirmed that no issue has been identified that would prevent the migration.

The collection of the information in some embodiments is part of an assessment operation performed by the infrastructure automation manager. This assessment operation directs the second network administrator of the infrastructure automation manager to initially assess whether any issue needs to be resolved before the migration. After the infrastructure automation administrator confirms that no issue has been identified, the method then provides data from the collected information to the NSX-V or NSX-T manager to provide a presentation to the first network administrator to review, in order to assess whether any issue needs to be resolved before the migration.

Figure 6:
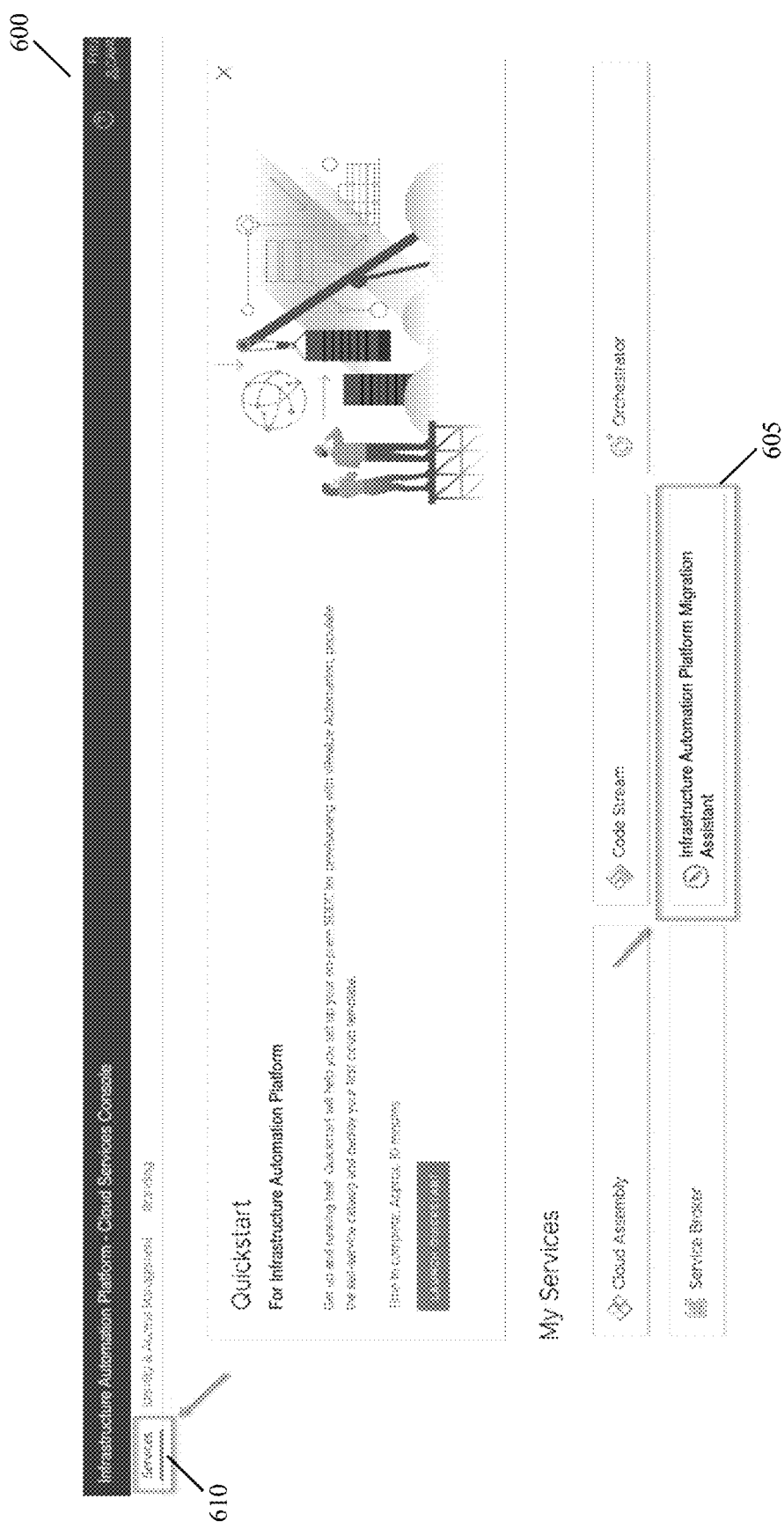
FIG. 6 illustrates an example of a user interface of a cloud service console of the infrastructure automation platform of some embodiments.

FIGS. 6-16 illustrate an overview of the migration process of some embodiments. FIG. 6 illustrates an example of a user interface 600 of a cloud service console of the infrastructure automation platform of some embodiments. Infrastructure automation platform administrator credentials and migration role privileges are required to log in to the cloud services console of the infrastructure automation platform. As shown, this UI includes a migration assistant control 605 for selecting the migration assistant of this platform. This control is selected in this example through a cursor click operation, which followed an earlier cursor click operation that selected the automation platform's services tile 610 that includes the migration assistant control 605.

The selection of the migration assistant control 605 starts a network virtualization migration process that is performed primarily within the context of a migration plan wizard of the infrastructure automation platform. This wizard uses a series of on-screen instructions and prompts. The infrastructure automation platform administrator and the network virtualization administrator are required to communicate with one another ahead of migration and during one of the migration plan steps in the process.

Figure 7:
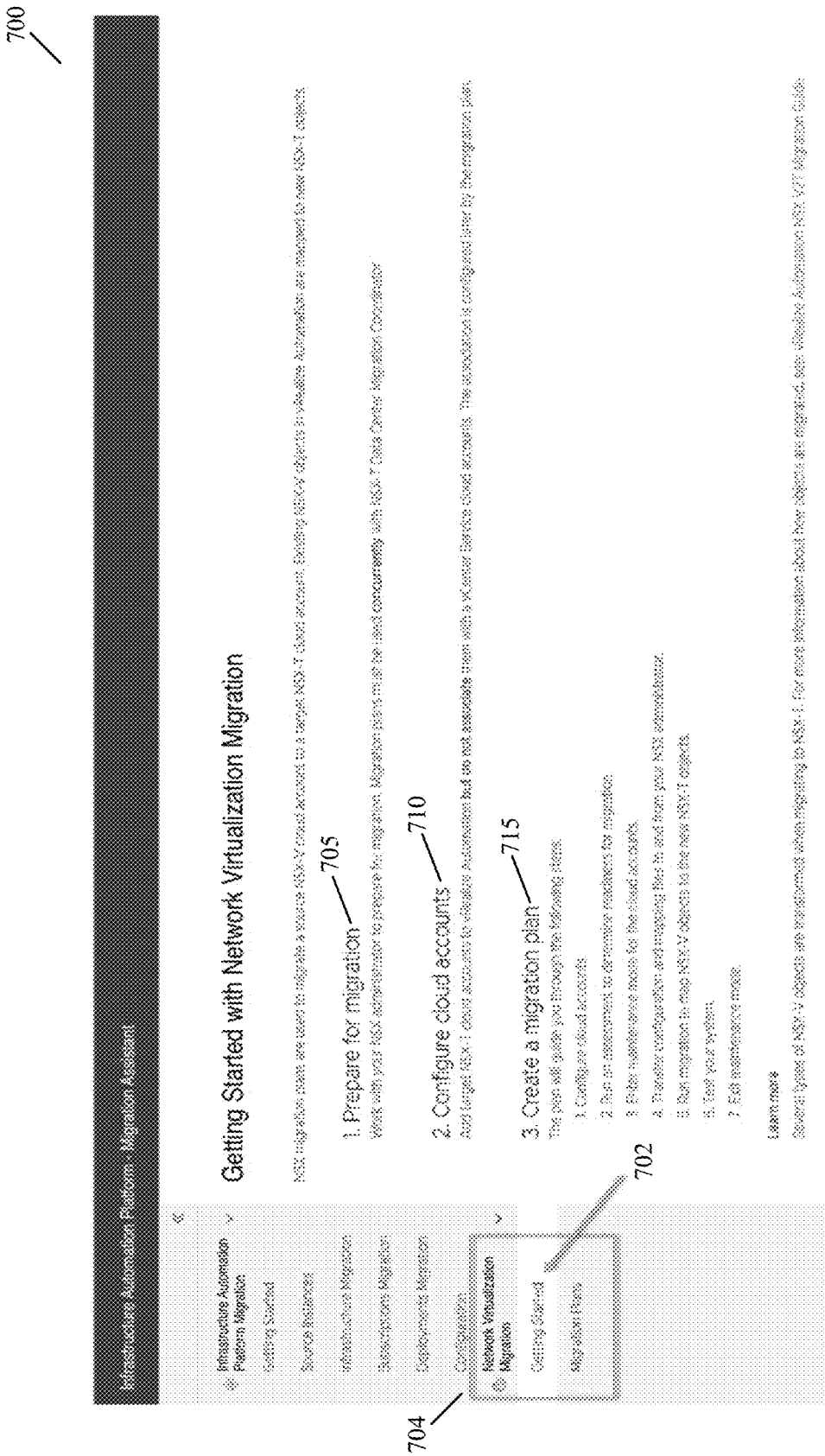
FIG. 7 illustrates an example of a Getting Started information page.

FIG. 7 illustrates an example of a Getting Started information page 700 that the user is presented in some embodiments after selecting of the migration assistant control 605 and clicking the getting started control 702 in a side panel 704 from the network virtualization migration menu. Through the information page, a user gains an overview of the migration process. The user is to review the migration overview to gain an overall understanding of the migration process and its supported topologies before the user begins the tasks described on the getting started page.

As shown in FIG. 7, the Getting Started page 700 specifies that the migration plans are used to migrate a source NSX-V cloud account to a target NSX-T cloud account, and that NSX-V objects in vRealize Automation (the infrastructure automation platform in this example) are mapped to new NSX-T objects. This page also lists the three steps 705, 710, and 715. The first step 705 in the list specifies that the user is to work with their network virtualization administrator to prepare for migration. Each migration plan requires input to and output from the new network virtualization data center migration coordinator utility in the network virtualization. During migration, the migration plan on-screen help informs the user when they need to share data files with the network virtualization administrator. Coordination between the user, as the infrastructure automation platform administrator, and the network virtualization administrator is helpful for successful migration. The user is to inform the network virtualization administrator(s) of the migration plans so that a network virtualization administrator can help import and export files in the network virtualization data center migration coordinator utility (e.g., the migration manager 220), which is the utility that performs the underlying network virtualization migration.

The second step 710 in the Getting Started page 700 specifies that the user has to configure the cloud account(s) of the target NSX-T to vRealize Automation. The third step 715 lists a sequence of sub-steps for performing the migration. As listed, the sequence of sub-steps include in some embodiments (1) configuring source and target cloud accounts, (2) running an assessment to determine readiness for migration, (3) entering maintenance mode for the cloud accounts, (4) transferring configuration and mapping files to and from the user network virtualization administrator, (5) running migration to map source network virtualization objects to new target network virtualization objects, (6) testing the system, and (7) exiting maintenance mode for the cloud accounts. Each of these sub-steps will be further described below. By starting the infrastructure automation platform migration utility, the user is thus able to begin to populate the network virtualization migration plan by following the perspective on-screen instructions and prompts, which guides the user through the seven sub-steps listed above.

As mentioned above, the second step 710 in the migration process is configuring cloud accounts. Before the user can migrate their previous network virtualization cloud accounts to the new network virtualization using the infrastructure automation platform migration assistant, the user is required to create a new and unassociated network virtualization target cloud account (i.e., each NSX-T cloud account) in the infrastructure automation platform for each source network virtualization cloud account (i.e., each NSX-V cloud account).

The user is to add a new target network virtualization cloud account to the infrastructure automation platform for each previous source network virtualization cloud account in their infrastructure automation platform projects. The user is required to create one target network virtualization cloud account for each source network virtualization cloud account to be migrated. The user specifies the 1:1 mapping from a source network virtualization cloud account to a target network virtualization cloud account when they create the migration plan. Each 1:1 cloud account mapping requires its own separate migration plan. The user specifies a Policy API method option when the user creates the network virtualization cloud account.

When creating a target network virtualization cloud account, this account must not be associated to a compute manager (e.g., VMware's vCenter) or compute manager server cloud account in the infrastructure automation platform. The network virtualization cloud account specified must not be in use by an infrastructure automation platform deployment.

Figure 8:
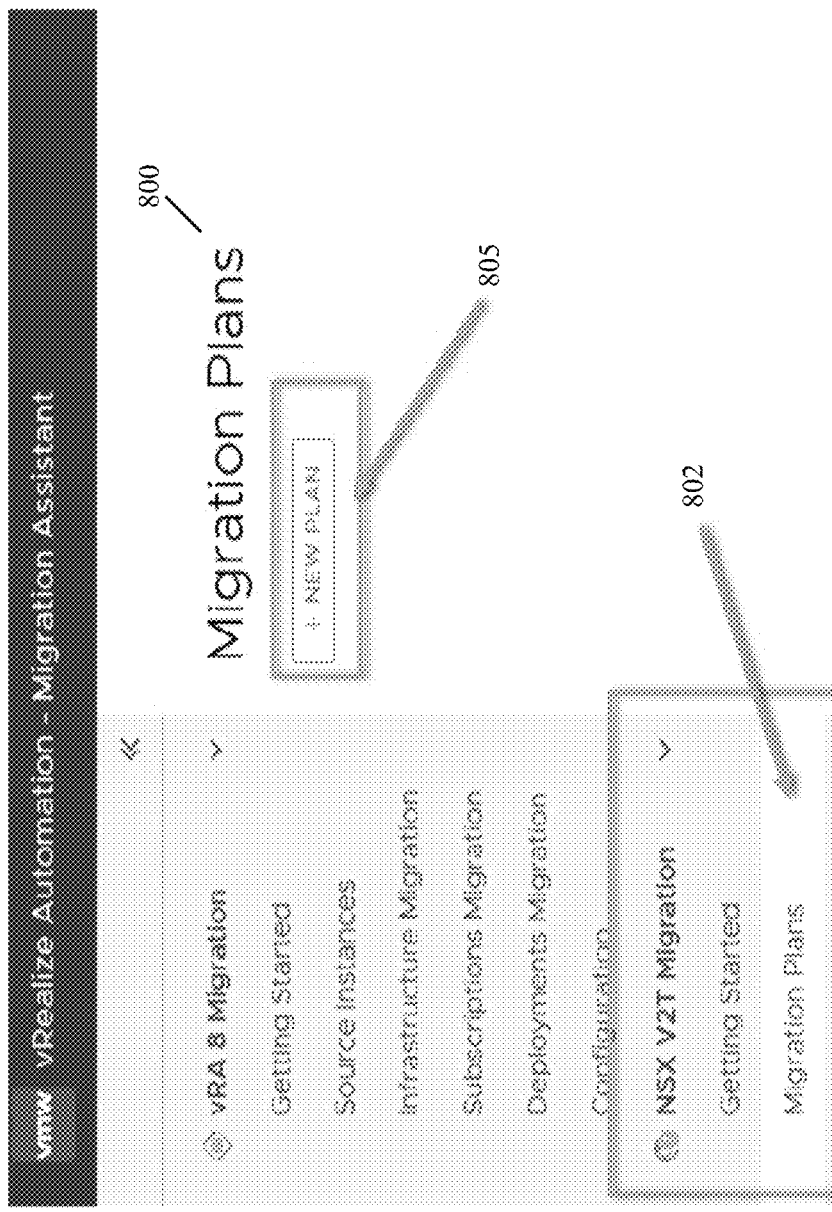
FIG. 8 illustrates an example of a migration plans pane that is displayed after a user selects the migration plans control.

After reviewing the Getting Started page 700, the user selects the Migration Plans control 802 in the side panel 704 of the network virtualization migration menu, as shown in FIG. 8. This figure illustrates a migration plans pane 800 that is displayed after the user selects the migration plans control 802. When the user is ready to start the migration, the user selects a new plan control 805 through a cursor click operation.

Figure 9:
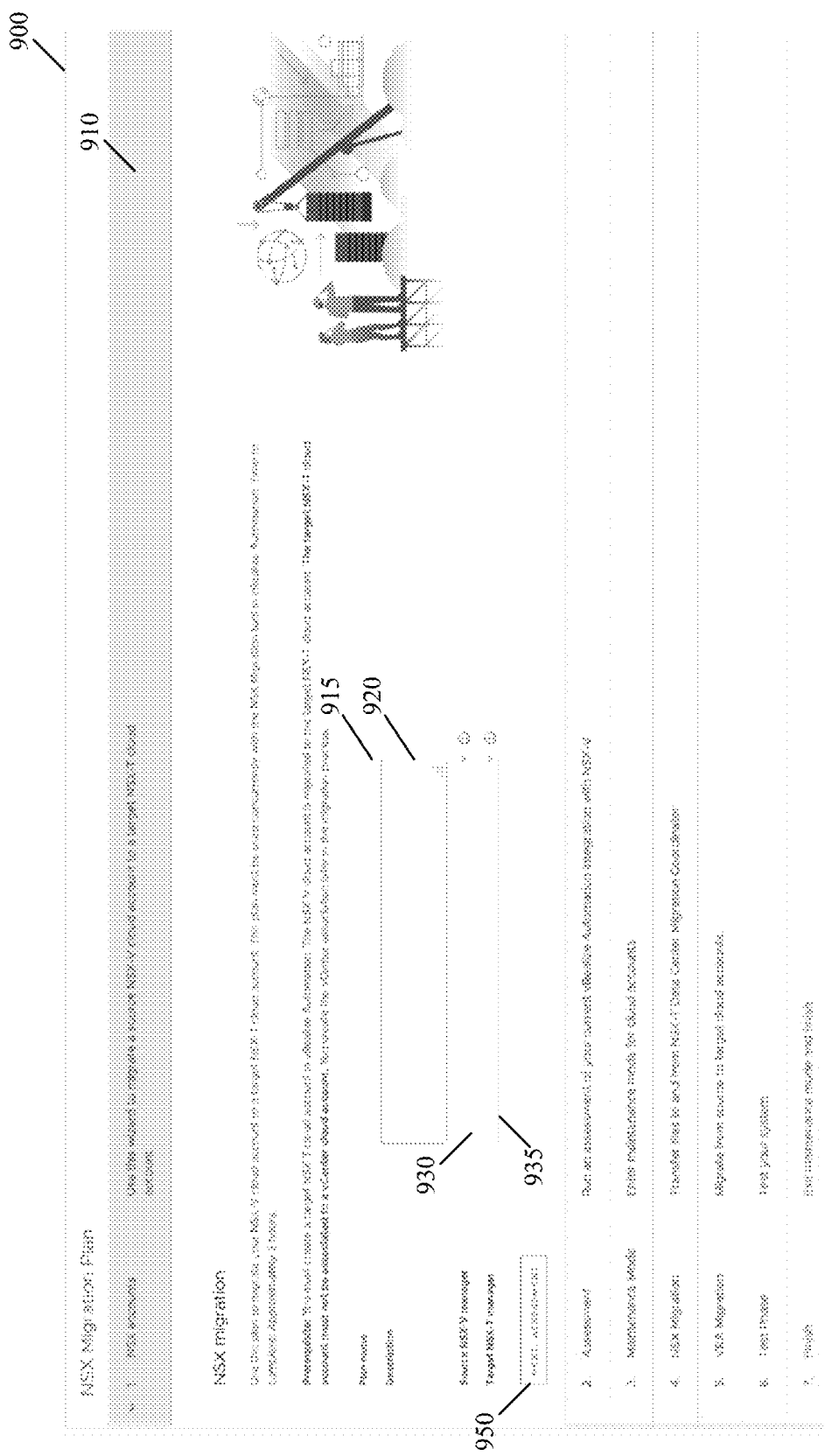
FIG. 9 illustrates an example of a migration display page that is displayed by the wizard after the user selects the new plan control in FIG. 8.

FIG. 9 illustrates an example of a migration display page 900 that is displayed by the wizard after the user selects the new plan control 805 in FIG. 8. In this page 900, the migration plan wizard then provides a sequence of seven steps that the user needs to perform in the network automation platform in order to successfully migrate a source network virtualization cloud account and its associated objects to the new target network virtualization. Each step is presented as another migration plan pane in the page 900. Each pane corresponds to one of the sequence of seven steps that the user has to perform. Each step requires successful completion of the previous step, as the migration plan advances in a linear sequence and each numbered page represents a step (stage) in the migration process.

As shown in FIG. 9, the first pane 910 has controls 915 and 920 that allow the user to create a new plan by providing a name and an optional description for it. This pane also requires the user to identify source and target cloud accounts. The user enters cloud account name of the infrastructure automation platform source network virtualization in the source manager field 930. Each source network virtualization cloud account requires a separate migration plan in the infrastructure automation platform migration assistant. The source network virtualization cloud account must be associated with a compute manager (e.g., VMware vCenter 7.0 or later) cloud account.

The user enters the infrastructure automation platform target network virtualization cloud account name in the target manager field 935. This account in some embodiments is the target network virtualization cloud account that the user created during the prerequisite phase of migration using the instructions on the getting started page. In some embodiments, this account cannot be already in use by the network automation platform for another existing deployment of the platform. Through these controls 915, 930 and 935, the user can name the migration plan and enter the 1:1 mapping for the source network virtualization cloud account and its target network virtualization cloud account.

Figure 10A:
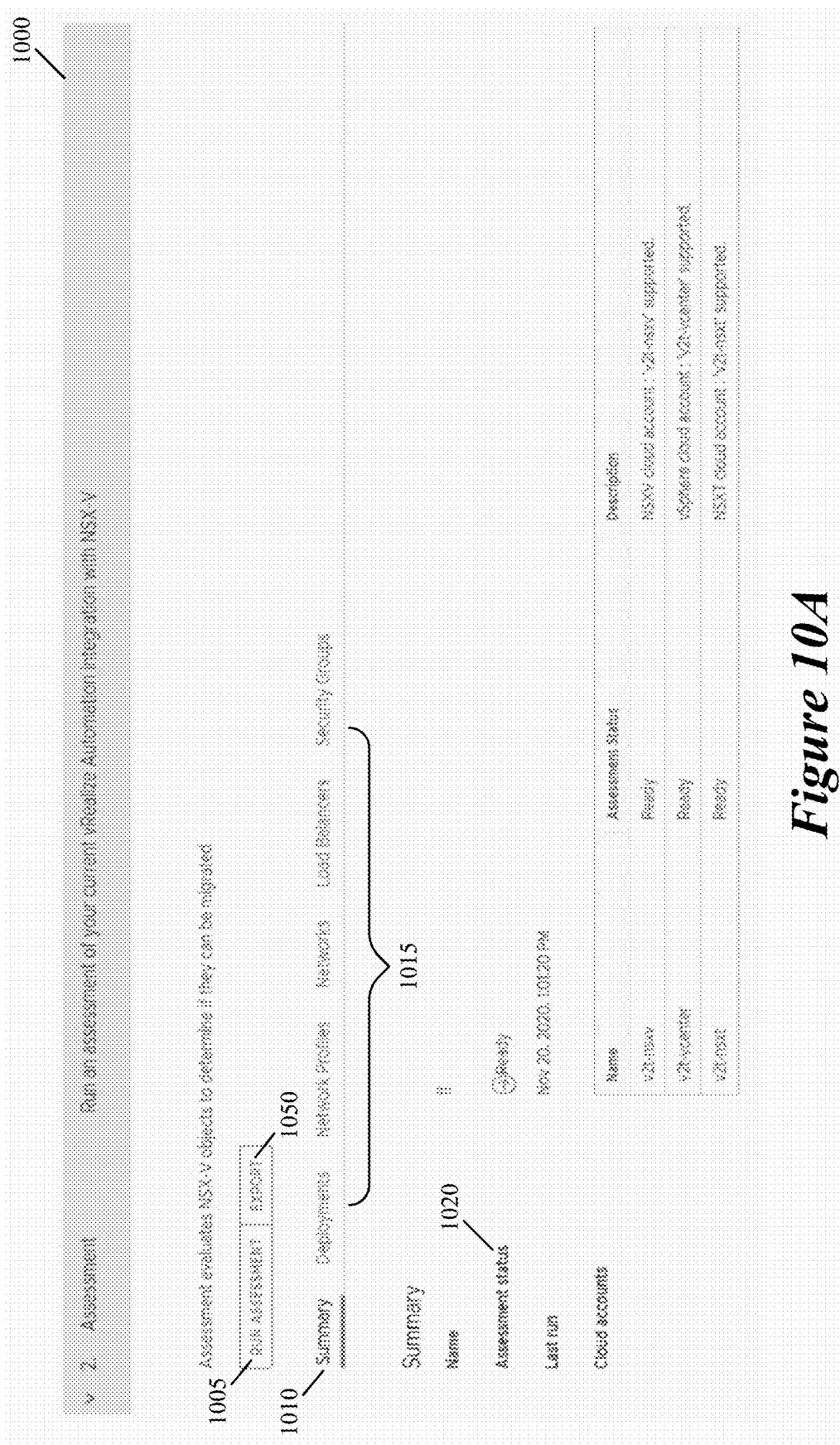
FIG. 10A illustrates an example of an assessment pane that the user can use to assess the network virtualization cloud accounts for migration readiness.

At the bottom of the first pane 910 is a next step control 950 that transitions the wizard to the second step in the migration process of the network automation platform. The second step is the assessment step. FIG. 10A illustrates an example of a second pane that is displayed after selecting the next step control 950. This pane is the assessment pane 1000 that the user can use to assess the network virtualization cloud accounts for migration readiness. During this step, the user runs an assessment to determine the migration readiness of the source network virtualization cloud account, and its related objects, to the target network virtualization and the readiness of the target network virtualization cloud account to receive the migrated objects.

The assessment pane has a run assessment control 1005 and an export control 1050. When selected, the assessment control 1005 directs the network automation platform to run an initial assessment. If the assessment displays an error, the user is to examine the output messages. Based on the messages that the user receives, the user is able to open a summary tab 1010 to review a summary of the assessment, or a series of other tabs 1015 that provide assessment data regarding different deployments, network profiles, networks, load balancers and security groups.

Figure 10B:
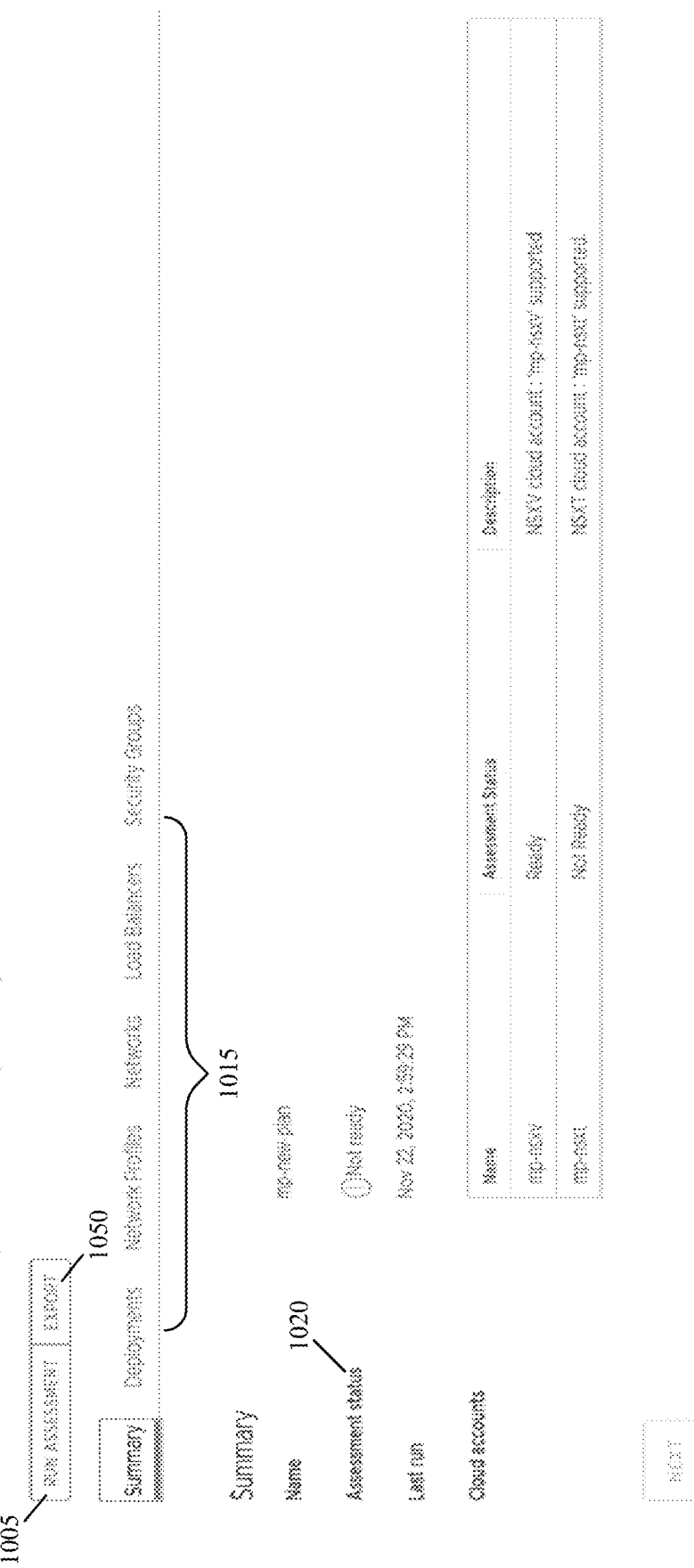
FIG. 10B illustrates an example of an assessment status after an issue is spotted for the cloud account.
Figure 10C:
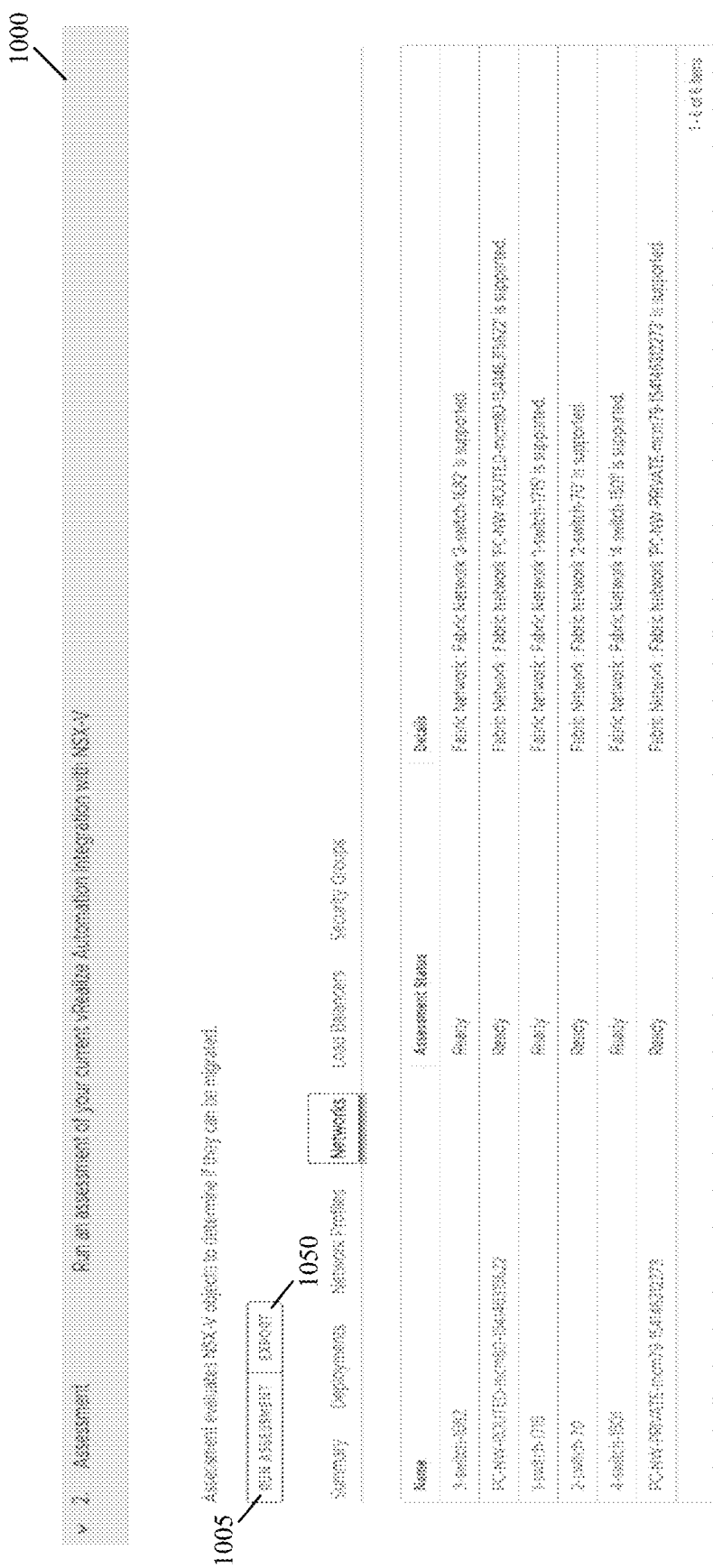
FIG. 10C illustrates an example of a networks tab that is opened to display several NSX-V network objects that are ready for migration as they are deemed to be supported for purposes of migration to NSX-T.
Figure 11:
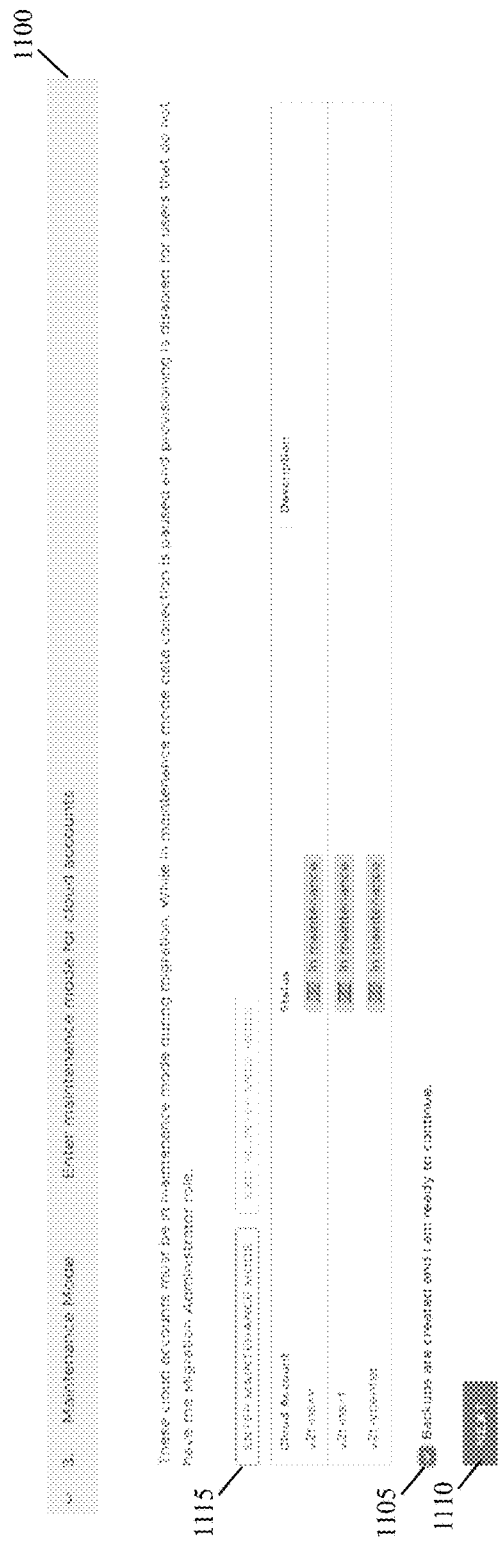
FIG. 11 illustrates an example of a maintenance mode pane in some embodiments.
Figure 12:
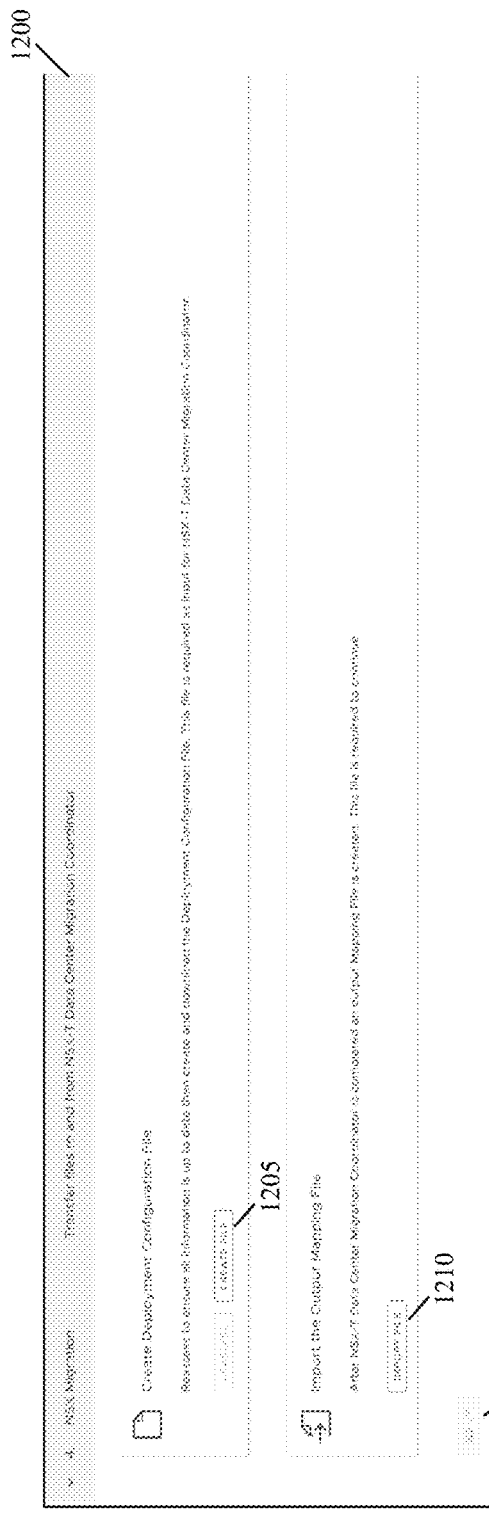
FIG. 12 illustrates an example of a transfer file pane in some embodiments.

In the example illustrated in FIG. 10A, the assessment pane displays an assessment status 1020 of "Ready" to indicate that no issues have been spotted for analysis by the user. FIG. 10B, on the other hand, illustrates an example in which the assessment status 1020 is now "Not Ready" as there has been an issue spotted for the NSX-T cloud account. For this account, the user has to make corrections and then select the run assessment control again. Each non-summary tab 1015 can be opened to view whether the objects associated with that tab that are ready for migration. In FIG. 10C, the networks tab is opened to display several NSX-V network objects that are ready for migration as they are deemed to be supported for purposes of migration to NSX-T.

When the user is satisfied with the assessment and is ready to continue, the user selects the export control 1050 through a cursor click operation. The selection of this control creates an exported file to help the user with post-migration testing prior to taking the cloud accounts out of maintenance mode. The selection of a next control 1055 on the assessment pane 1000 moves to migration wizard to the next pane, which is the maintenance mode pane 1100 illustrated in FIG. 11.

The maintenance mode pane allows the user to put the cloud NSX-V, NSX-T and vCenter accounts into maintenance mode operation. When a cloud account is in maintenance mode, all allocation, provisioning, day 2 actions, and scheduled enumeration is stopped for that cloud account. This ensures that no impacted infrastructure automation platform deployments can be initiated, edited, or in operation while its affiliated network virtualization cloud account is in the process of being migrated to the new network virtualization. While maintenance mode prevents the use of the cloud accounts, and any objects that are related to the cloud account, the infrastructure automation platform administrators that have the migration administrator service role are still provided with testing access. After selecting the enter maintenance mode control 1115, the user is able to create a backup of their infrastructure automation platform environment. Once the needed backup is created, a checkbox 1105 is selected which indicates that the backups are created and the user is ready to continue.

By selecting a next control 1110 through a cursor click operation, the user can then direct the migration wizard to move to the pane for the next step in the migration process. This next pane is the transfer file pane 1200 of FIG. 12. This pane has (1) a create export file control 1205 that the user can use to direct the wizard to export a deployment configuration file as input for the network virtualization data center migration coordinator service, and (2) an import file control 1210 that the user can use to direct the wizard to import an output mapping file created by the migration coordinator service.

The exported deployment configuration file identifies the logical network components that were deployed at the direction of the network infrastructure platform in the NSX-V deployment that is being migrated to NSX-T. The export file is supplied to the network virtualization administrator for input to the NSX-T data center. The imported mapping output file is generated by the network virtualization data center coordinator service. In some embodiments, the infrastructure automation platform administrator obtains this mapping output file from the network virtualization administrator.

FIGS. 12-15 illustrate the process performed by the infrastructure automation platform administrator in the infrastructure automation platform and tasks that are performed by the network virtualization administrator in the network virtualization to complete the file exchange operation, which is the fourth sub-step of operations of the third step 715. As mentioned above, the infrastructure automation platform administrator and the network virtualization administrator in some embodiments can be different people or they may be the same person.

When the user selects the create file control 1205, the user might be presented with errors or warnings about objects that are not ready for migration. If so, the user has to address the issues as suggested and then click the reassess control. In some embodiments, the create file control option is not re-enabled until the user clicks the reassess control and receives no further errors or warnings.

Figure 13:
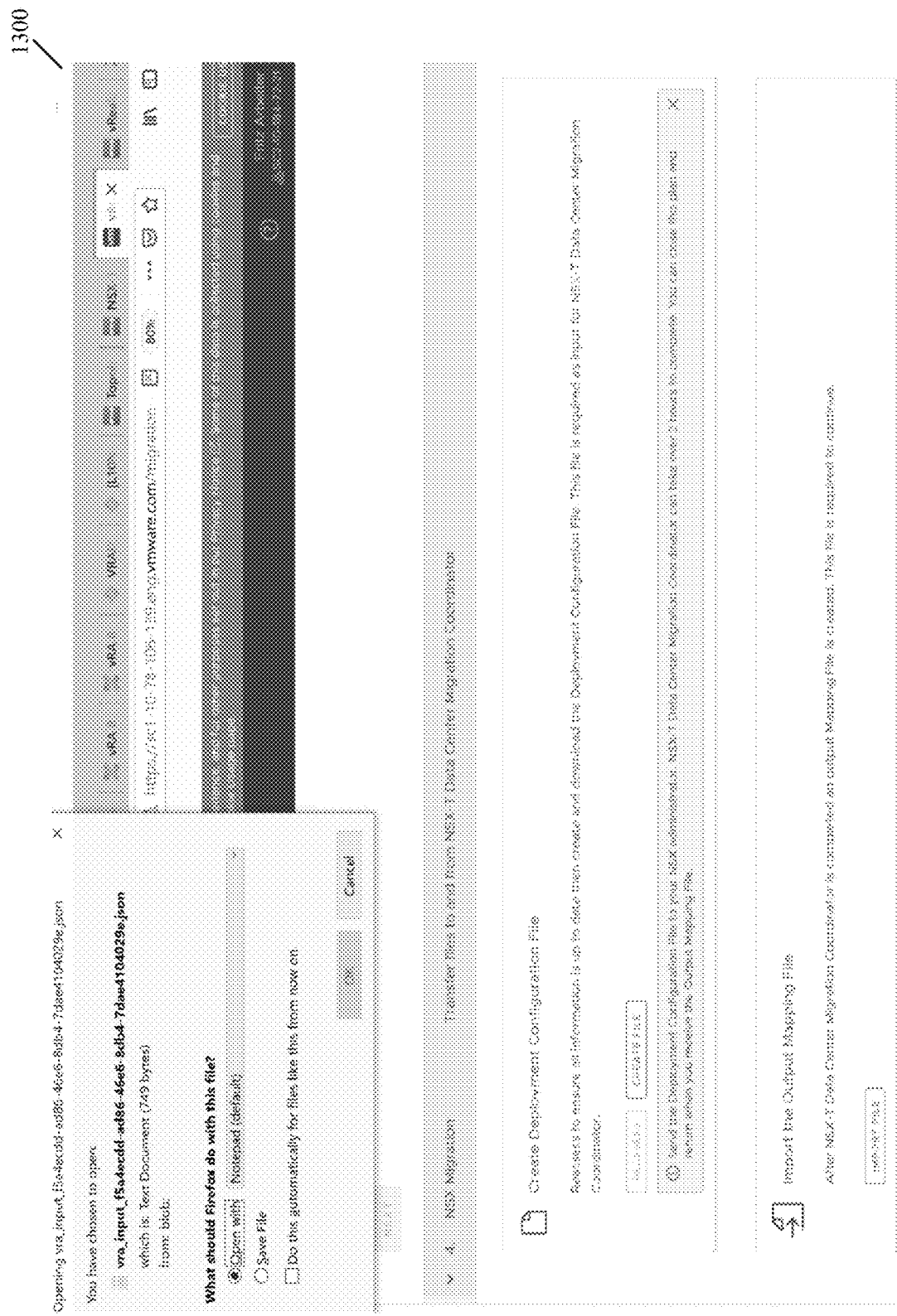
FIG. 13 illustrates an example of a display window that contains a prompt to save a JSON file and instructions about where to send the file.

When the user selects the create file control 1205, and the network automation platform does not detect any errors, the migration wizard provides a display window 1300 of FIG. 13. This display window contains a prompt to save a JSON file and instructions about where to send the file. This JSON file will be the deployment configuration file. The information stored in the JSON file in some embodiments was collected during the assessment phase, in order to avoid the migration wizard from performing multiple rounds of data collection. After the deployment configuration file is generated, and as prompted, the user is to send it to the network virtualization administrator and direct this administrator to import it into the network virtualization data center migration coordinator service.

Figure 14:
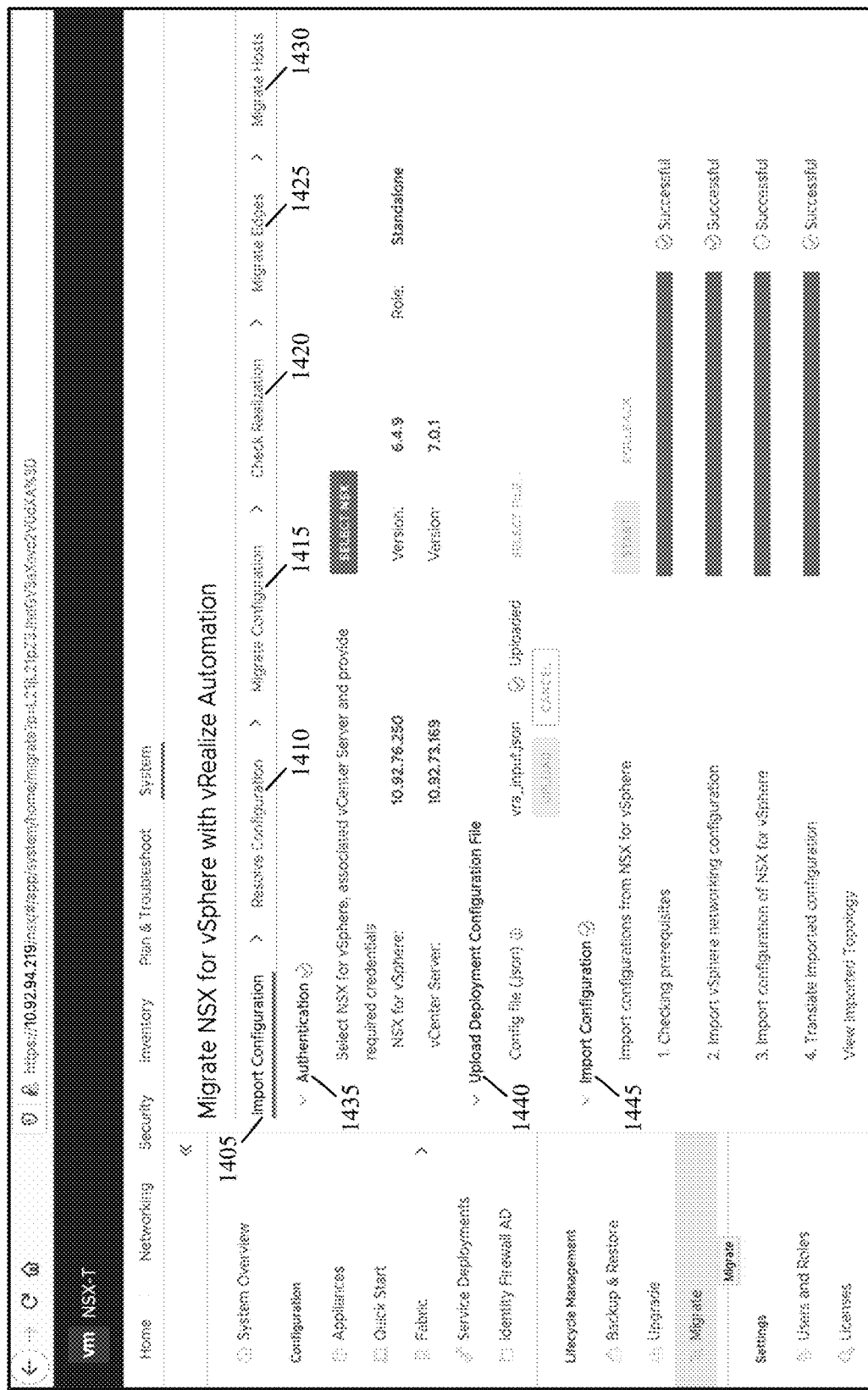
FIG. 14 illustrates a UI of the NSX-T migration service through which the network virtualization administrator in some embodiments imports the deployment configuration file exported by the migration wizard of the network automation platform.

FIG. 14 illustrates a UI of the NSX-T migration service through which the network virtualization administrator in some embodiments imports the deployment configuration file exported by the migration wizard of the network automation platform. As shown, this UI has several tabs, which are an import configuration tab 1405, a resolve configuration tab 1410, a migrate configuration tab 1415, a check realization tab 1420, a migrate edges tab 1425 and a migrate host tab 1430. The import configuration tab has authentication control 1435 for authenticating the credentials of the manager that provides the deployment configuration file, an upload control 1440 for importing the deployment configuration file, and an import configuration control 1445 for performing a series of checks on the imported deployment configuration file.

The resolve configuration tab allows the network administrator of NSX-T to review issues with the imported configuration. To resolve some of the issues, the network administrator can provide acknowledgements or additional information through the controls provided by the resolve configuration tab. However, to resolve other issues, the network administrator in some embodiments has to perform other operations outside of the migration wizard.

Assuming that no issues exist, the network administrator next uses the migrate configuration tab 1415 to migrate the configuration to an NSX-T network configuration. In some embodiments, this operation entails using the templates stored in the storage 250 to correctly map the logical network components defined by the network automation platform for NSX-V to the logical network components that the network automation platform would have deployed for NSX-T.

Next, through the check realization tab 1420, the network administrator can make sure that there are no errors in migrating the logical network components from their NSX-V to their NSX-T implementations. After this check, the network administrator can then direct the migration of the network edge elements (e.g., gateways) and then migrate the machines (e.g., VMs, containers, Pods, etc.) connected to the migrating SD network.

Figure 15:
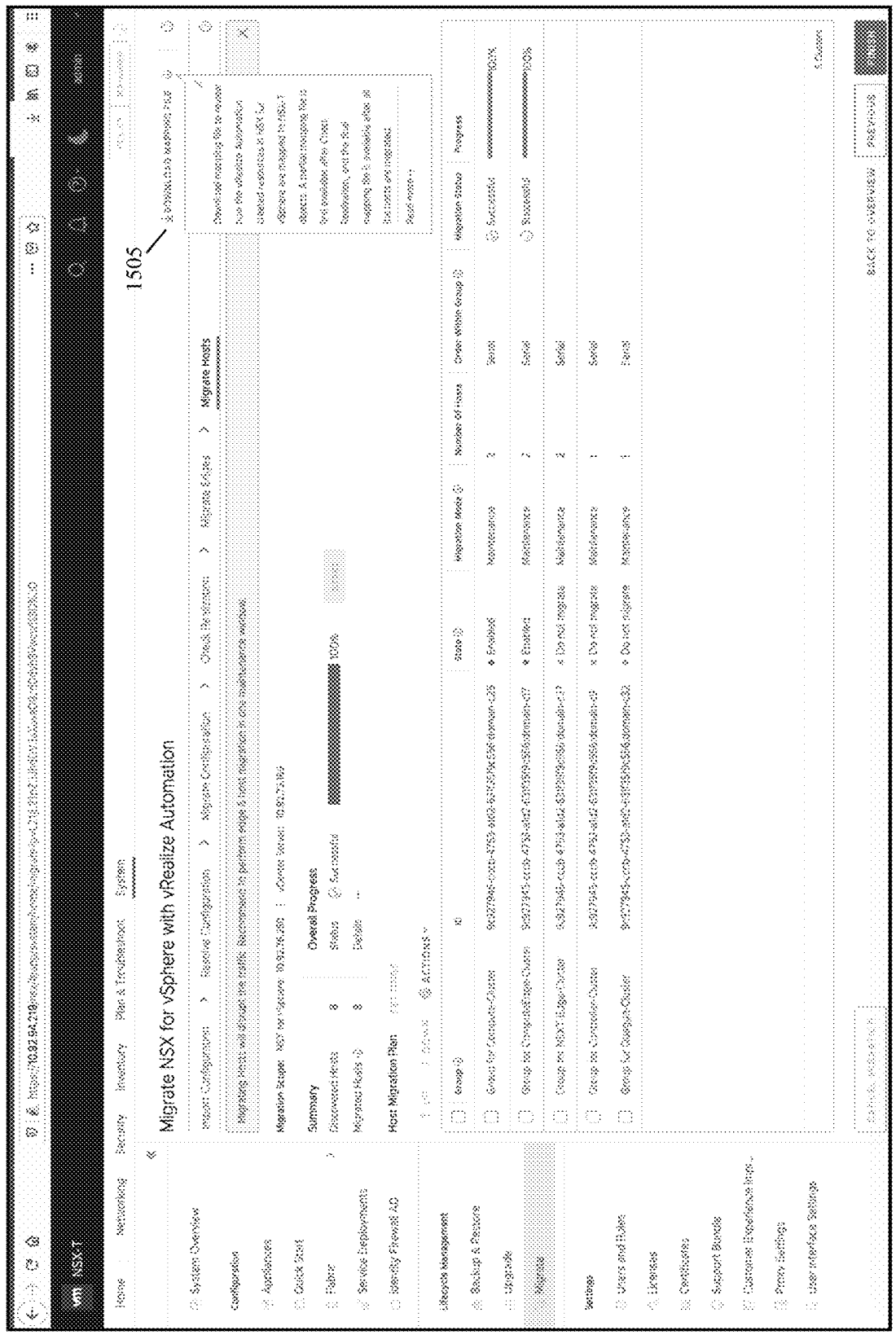
FIG. 15 illustrates an example of the network administrator of NSX-T selecting a download mapping file control to direct NSX-T migration service to generate the output mapping file that needs to be supplied to the network automation platform migration wizard.

FIG. 15 illustrates that after migrating the machines (referred to hosts in the UI of FIGS. 14 and 15), the network administrator of NSX-T can select the download mapping file control 1505 to direct NSX-T migration service to generate the output mapping file that needs to be supplied to the network automation platform migration wizard. This mapping file contains several records that map the identifiers of the NSX-V logical components previously deployed in the NSX-V deployment by the network automation platform to NSX-T logical components that the migration service deploys in the new NSX-T deployment for the network automation platform to manage going forward.

The administrator of the network automation platform obtains the output mapping file from the NSX-T administrator. After obtaining the output mapping file, the administrator of the network automation platform imports it into the migration wizard by using the import file control 1210 of FIG. 12. After the user imports the output mapping file from network virtualization data center migration coordinator, the migration wizard can use this mapping file to migrate cloud accounts and their related objects in the infrastructure automation platform. When the output mapping file has been successfully imported, the migration wizard displays a selectable next control 1215 in FIG. 12, which when selected by the user moves the migration wizard to the next pane of the migration plan to continue with the migration process. This next pane is the migration pane that includes controls for migrating cloud accounts and their related objects in infrastructure automation platform.

Figure 16:
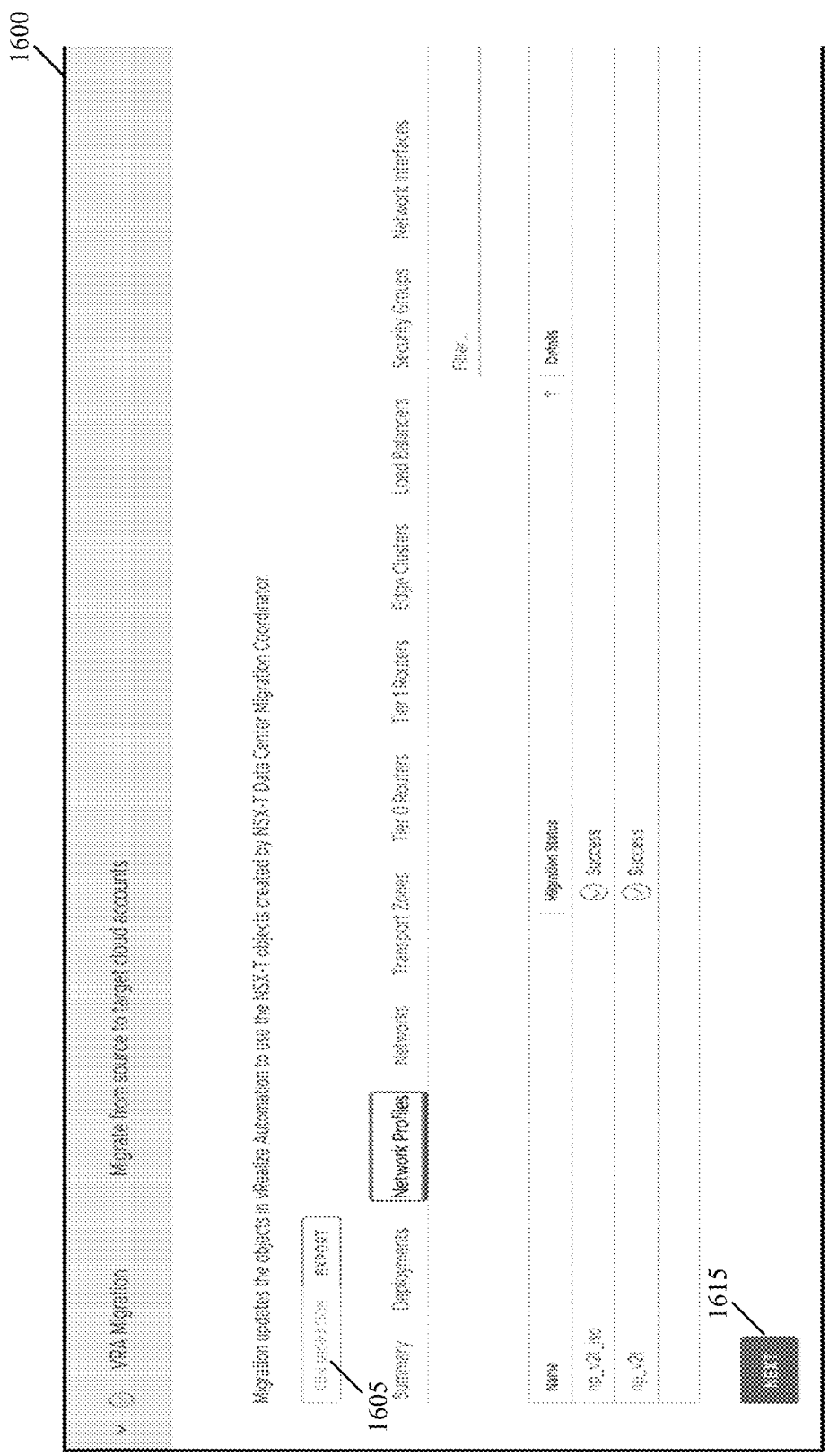
FIG. 16 illustrates an example of a migration pane of the migration wizard of some embodiments.
Figure 17:
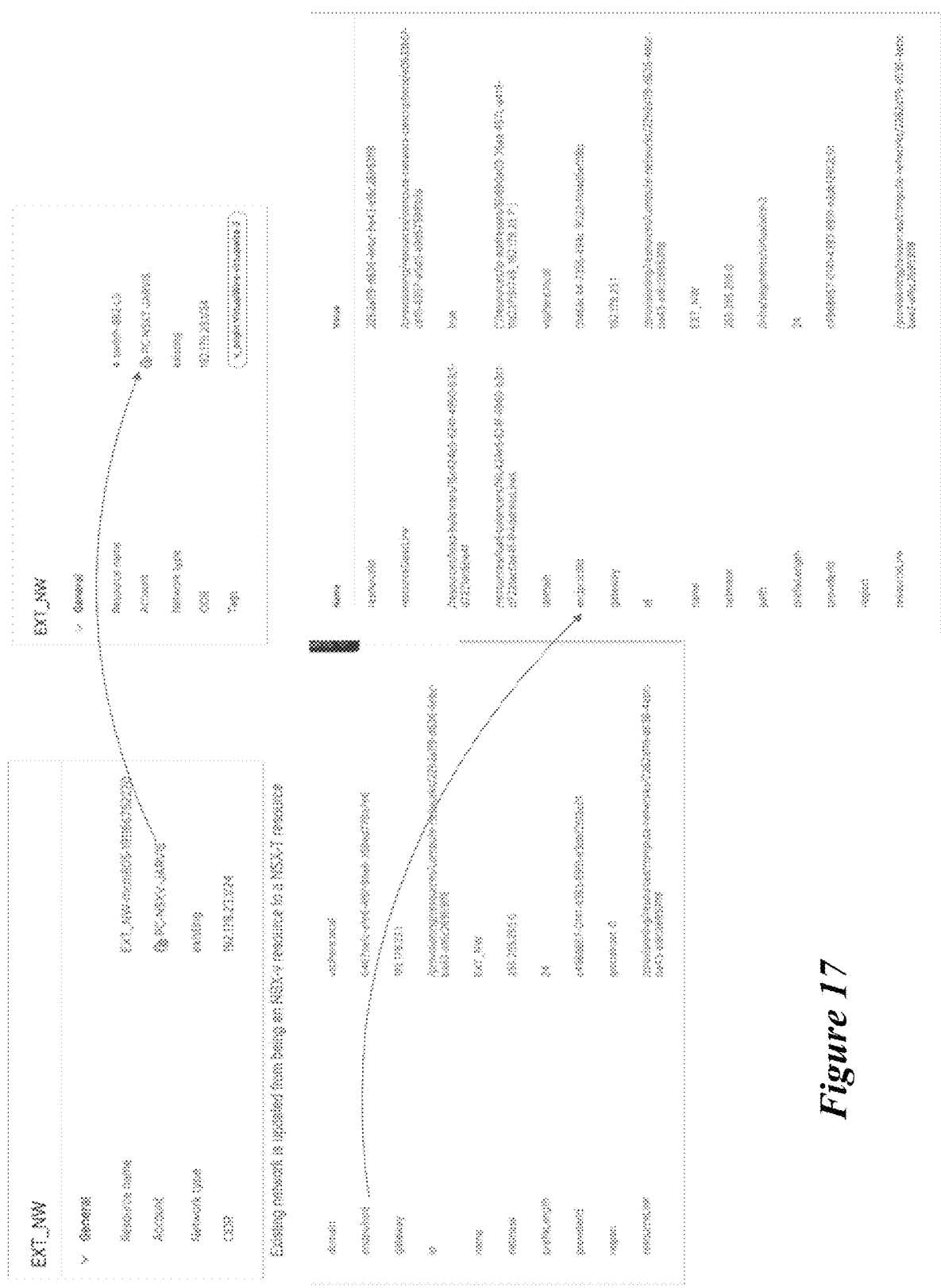
Figure 19:
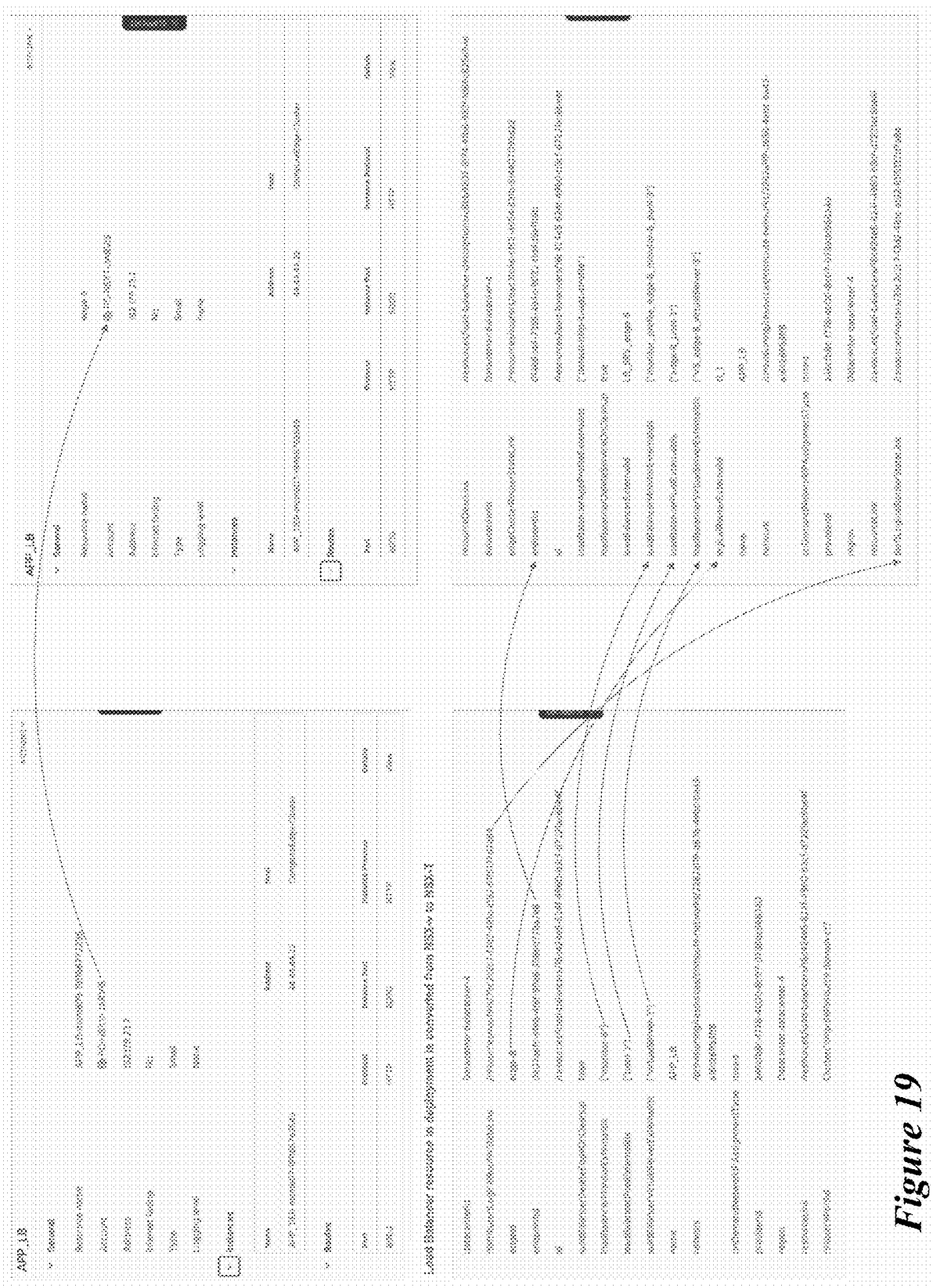

FIG. 16 illustrates an example of a migration pane 1600 of the migration wizard of some embodiments. Through this pane, the user can run the migration operation that maps the source network virtualization cloud account and its related objects in the infrastructure automation platform to the target network virtualization cloud account and its related objects that were created by the NSX-T migration service. This stage of the migration uses data in the output mapping file of the NSX-T migration service (which the user imported on the previous page in the migration plan) to migrate the previous network virtualization cloud account to the new network virtualization in the infrastructure automation platform.

The migration pane has a run migration control 1605, which when selected through a cursor click operation directs the migration wizard to migrate the previous network virtualization cloud accounts and their associated objects in the infrastructure automation platform to the new network virtualization cloud accounts and objects. When the migration is complete, a summary message will appear. If the run migration action is not successful, the user is to examine the output messages on the summary page and open each relevant tab to discover where problems were found.

Depending on what problems may have occurred during migration, the user is able to decide to continue or to use the snapshot backups that they created earlier to discard the migration and restore their cloud accounts and objects to their pre-migration status. If the objects have been migrated in the network virtualization data center migration coordinator, the user also needs to roll back the actual network virtualization migration. To generate a history file of the migration for the user's future reference, the export control is selected. Selecting a next control 1615 in FIG. 16 directs the migration wizard to move to the next pane in the migration plan and thereby continue with the migration process.

FIGS. 17-22 illustrate examples of the migration wizard of the network automation platform migrate the previous network virtualization cloud accounts and their associated objects in the infrastructure automation platform to the new network virtualization cloud accounts and objects. These figures illustrate data structures that the infrastructure automation platform created for the old NSX-V objects and the new NSX-T objects for various classes of objects, which are existing network objects of FIG. 17, edge gateway network objects of FIG. 18, load balancer network objects of FIG. 19, outbound network objects of FIG. 20, security group network objects of FIG. 21, and network profile objects of FIG. 22.

Figure 20:
Figure 21:
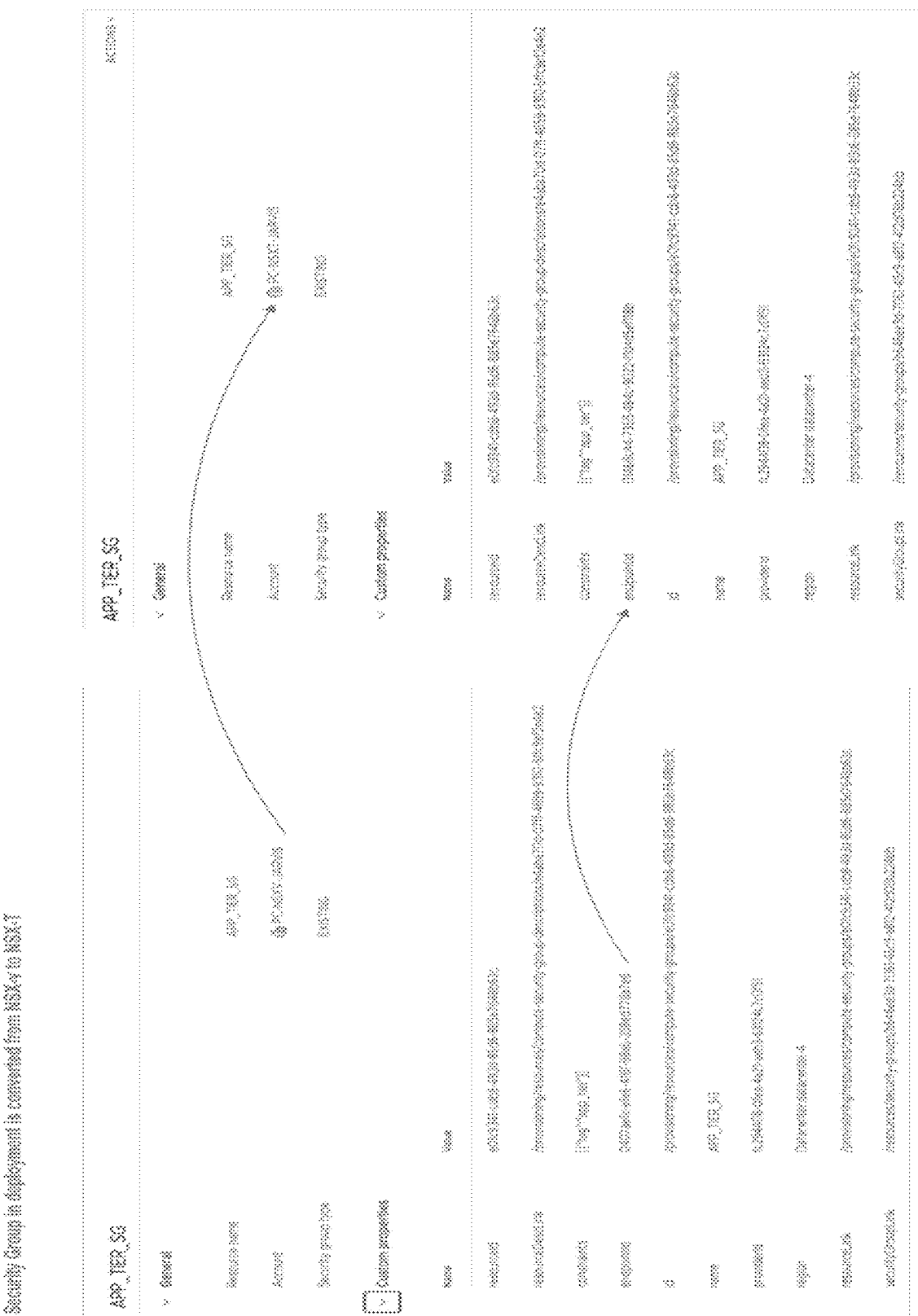
Figure 22:
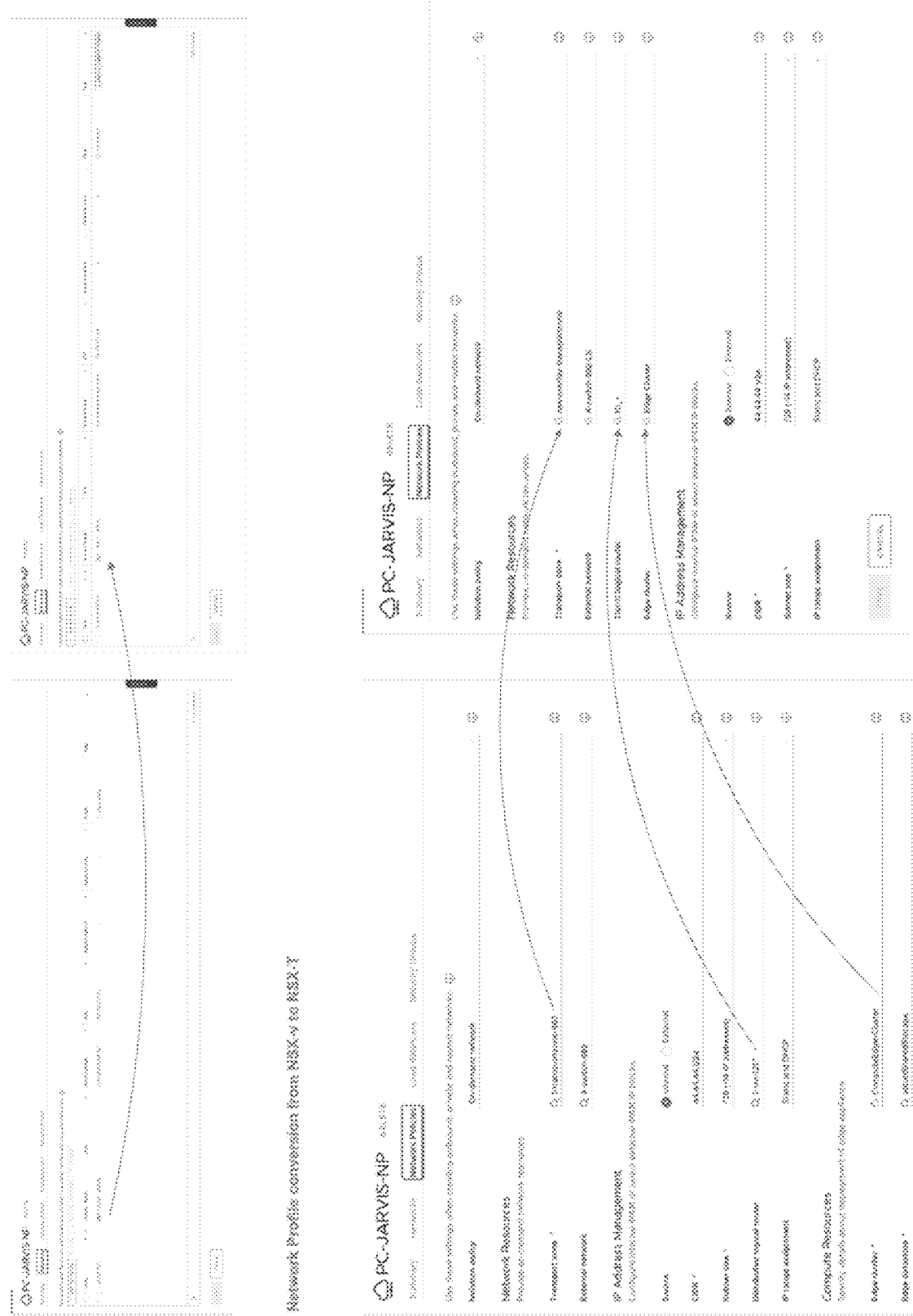

The migration wizard creates all the new NSX-T network objects based on the information contained in the output mapping file provided by the NSX-T migration manager. This output mapping file correlates the name of the identifiers of the old NSX-V objects to the identifiers of the new NSX-T objects. The association between the old and new names is conceptually illustrated in FIGS. 17-22 by arrows from the old names to the new names, e.g., the endpoint names in FIGS. 17, 18, and 21, the edge and load balance identifiers in FIG. 19, the edge and endpoint identifiers in FIG. 20, and the transport and edge cluster names in FIG. 22. When the structure of the logical network component changes, the output mapping file also provides this information, and the created network objects reflect this change. For instance, FIGS. 20 and 22 shows the distributed logical router in the old NSX-V objects being replaced by tier 0 routers in the new NSX-T objects.

After migration is complete, the cloud accounts are left in maintenance mode and tests are run to verify the migration results. The cloud accounts and their related objects are still in maintenance mode and no work can be done on them. However, infrastructure automation platform administrators who have the migration assistant administrator role are able to access the cloud account objects for post-migration testing, and are able to perform limited testing on cloud accounts that are in maintenance mode.

Figure 23:
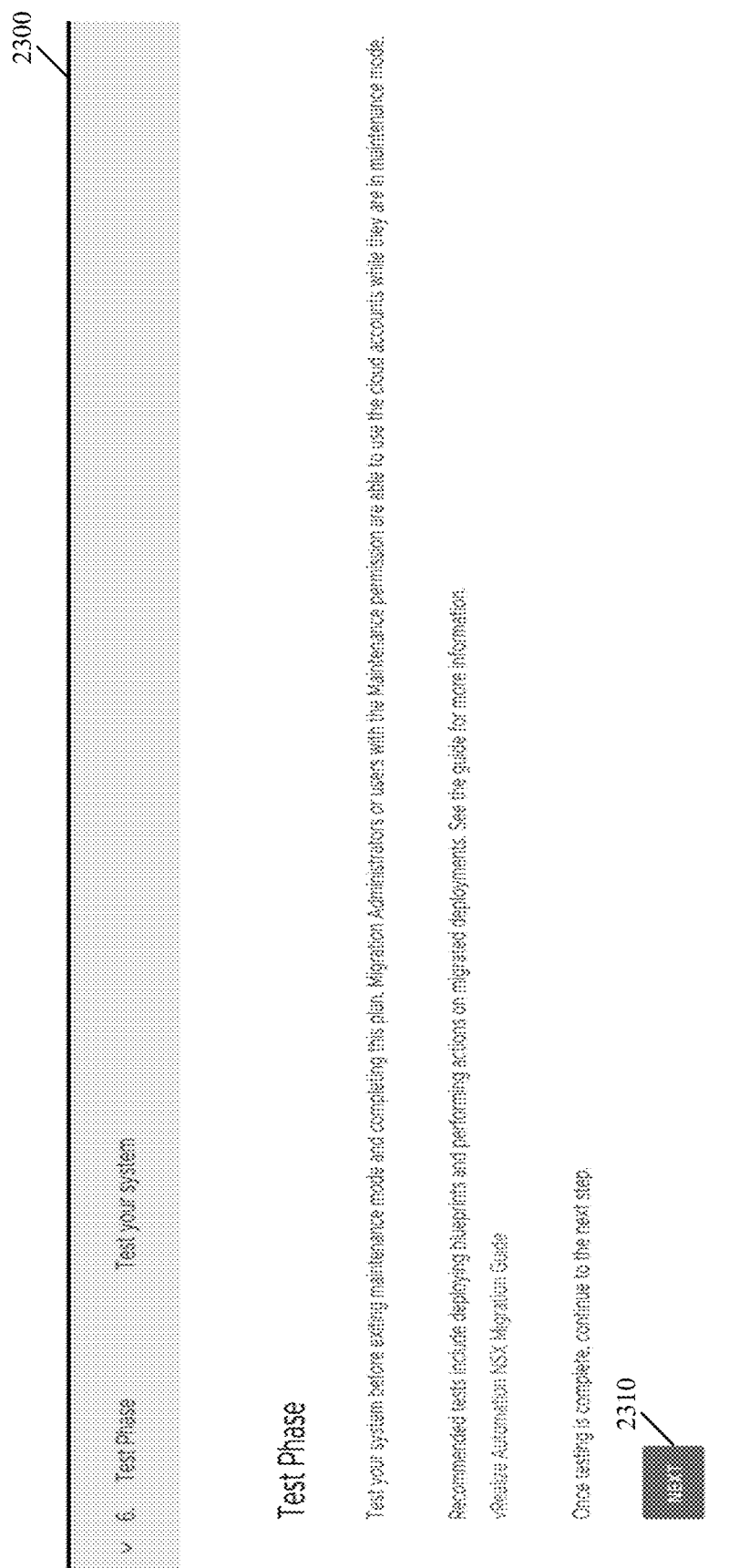
FIG. 23 illustrates an example of a test pane in some embodiments.

As mentioned above, selection of the next control 1615 in FIG. 16 directs the migration wizard to move to the next pane in the migration plan, which is the test pane 2300 illustrated in FIG. 23. Ideally the user creates a test plan for their organization, but general suggestions for testing are provided through the test pane 2300. These suggestions in some embodiments include the following: (1) review any warnings that were generated during migration, (2) test the 1:1 cloud account mapping that the user specified in plan step 1, (3) test a sample or all of the impacted cloud templates and deployments, (4) examine mapped network virtualization load balancers, networks, and security groups to verify that they are configured as expected, (5) provision and destroy applications by deploying cloud templates and confirming that the applications land on the correct endpoint and that they are functional, and (6) monitor previously deployed applications to verify that they are functioning as intended.

After the user completes post-migration testing, the user can select a next control 2310 on the test pane in order to complete the migration process. At this point, the user removes the cloud accounts (e.g., the NSX-T, vCenter and VRA accounts) from maintenance mode by selecting the infrastructure automation platform resources that are currently in maintenance mode and removing their maintenance mode marker and responding to any prompts. To exit the plan and complete the migration plan, the user selects a finish control displayed in the migration user. After the user exits the migration plan, the user must perform some post-migration cleanup tasks in the associated compute manager (e.g., vCenter) environments. After the user has completed these final post-migration tasks, the user can share information with other users about moving forward with the migrated resources.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 24:
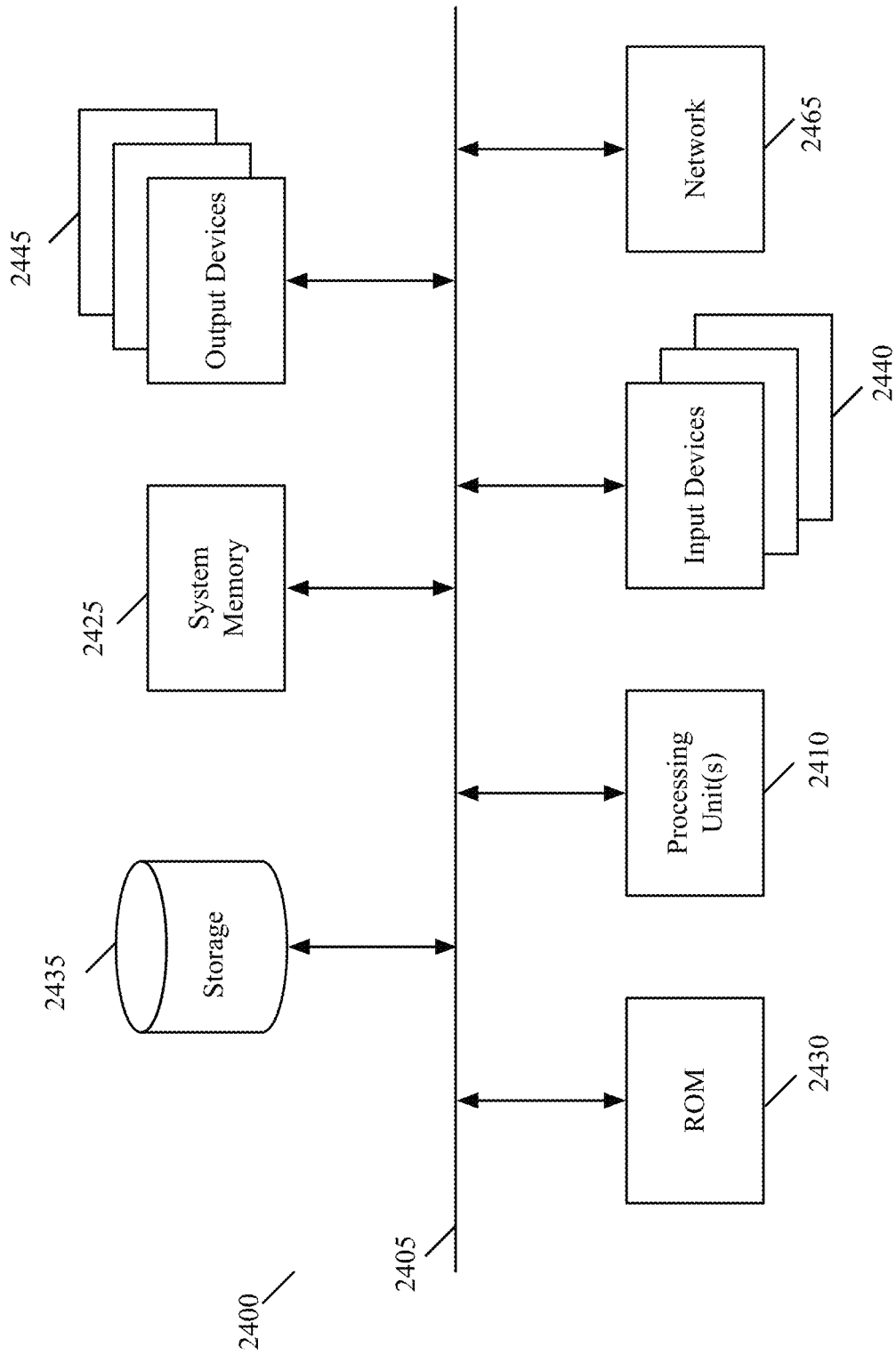
FIG. 24 conceptually illustrates a computer system with which some embodiments of the invention are implemented.

FIG. 24 conceptually illustrates a computer system 2400 with which some embodiments of the invention are implemented. The computer system 2400 can be used to implement any of the above-described computers and servers. As such, it can be used to execute any of the above described processes. This computer system includes various types of non-transitory machine readable media and interfaces for various other types of machine readable media. Computer system 2400 includes a bus 2405, processing unit(s) 2410, a system memory 2425, a read-only memory 2430, a permanent storage device 2435, input devices 2440, and output devices 2445.

The bus 2405 collectively represents all system, peripheral, and chipset buses that communicatively connect the numerous internal devices of the computer system 2400. For instance, the bus 2405 communicatively connects the processing unit(s) 2410 with the read-only memory 2430, the system memory 2425, and the permanent storage device 2435.

From these various memory units, the processing unit(s) 2410 retrieve instructions to execute and data to process in order to execute the processes of the invention. The processing unit(s) may be a single processor or a multi-core processor in different embodiments. The read-only-memory (ROM) 2430 stores static data and instructions that are needed by the processing unit(s) 2410 and other modules of the computer system. The permanent storage device 2435, on the other hand, is a read-and-write memory device. This device is a non-volatile memory unit that stores instructions and data even when the computer system 2400 is off. Some embodiments of the invention use a mass-storage device (such as a magnetic or optical disk and its corresponding disk drive) as the permanent storage device 2435.

Other embodiments use a removable storage device (such as a flash drive, etc.) as the permanent storage device. Like the permanent storage device 2435, the system memory 2425 is a read-and-write memory device. However, unlike storage device 2435, the system memory is a volatile read-and-write memory, such a random access memory. The system memory stores some of the instructions and data that the processor needs at runtime. In some embodiments, the invention's processes are stored in the system memory 2425, the permanent storage device 2435, and/or the read-only memory 2430. From these various memory units, the processing unit(s) 2410 retrieve instructions to execute and data to process in order to execute the processes of some embodiments.

The bus 2405 also connects to the input and output devices 2440 and 2445. The input devices enable the user to communicate information and select commands to the computer system. The input devices 2440 include alphanumeric keyboards and pointing devices (also called "cursor control devices"). The output devices 2445 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 24, bus 2405 also couples computer system 2400 to a network 2465 through a network adapter (not shown). In this manner, the computer can be a part of a network of computers (such as a local area network ("LAN"), a wide area network ("WAN"), or an Intranet, or a network of networks, such as the Internet. Any or all components of computer system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of managing migration of a first software-defined (SD) network to a second software-defined network, wherein first and second network managers respectively deploy first and second sets of network components in the first and second software-defined networks respectively, the method comprising:
   at a third network manager that provides an interface to allow a set of administrators to specify network components to deploy in the first SD network or the second SD network:
      receiving a notification of the migration of the first SD network to the second SD network;
      collecting information to allow a first network administrator interfacing with the first or second network manager, and a second network administrator interfacing with the third network manager, to review in order to assess whether any issue needs resolution before the migration, said collected information provided to the first or second network manager for presentation to the first network administrator;
      performing the migration after the first and second administrators have assessed the collected information and confirmed that no issue has been identified that would prevent the migration.

2. The method of claim 1, wherein the first network administrator is an administrator of the second network manager.

3. The method of claim 1, wherein the first network administrator is an administrator of the first network manager.

4. The method of claim 1, wherein said collecting comprising:
directing the second network administrator of the third network manager to initially assess whether any issue needs to be resolved before the migration;
after the second network administrator confirms that no issue has been identified, providing data from the collected information to the first or second manager to provide a presentation to the first network administrator to review, in order to assess whether any issue needs to be resolved before the migration.

5. The method of claim 1 further comprising placing the network components that implement the first SD network in a maintenance mode that keeps the network components operational but prevents updates to the network components.

6. The method of claim 5, wherein placing the network components in maintenance mode comprises placing any account of the first network manager that is associated with the first SD network in maintenance mode.

7. The method of claim 6 further comprising placing any account of the second network manager that is associated with the second SD network in maintenance mode to ensure that only a migration program responsible for migrating the first SD network to the second SD network is allowed to deploy network components for the second SD network during the migration.

8. The method of claim 7, wherein the third network manager allows one or more logical network components to be specified, and the first and second network managers configure physical network components to implement the logical network components.

9. The method of claim 7, wherein the third network manager allows one or more logical network components to be specified, and the first and second network managers initially define other logical network components to implement the logical network components specified by the third network manager and then configure physical network components to implement the logical network components that they respectively define.

10. The method of claim 7 further comprising removing the accounts from maintenance mode after the migration of the first SD network to the second SD network has been completed.

11. A non-transitory machine-readable medium storing a program which when executed by at least one processing unit manages migration of a first software-defined (SD) network to a second software-defined network, wherein first and second network managers respectively deploy first and second sets of network components in the first and second software-defined networks respectively, the program comprising sets of instructions for:
at a third network manager that provides an interface to allow a set of administrators to specify network components to deploy in the first SD network or the second SD network:
receiving a notification of the migration of the first SD network to the second SD network;
collecting information to allow a first network administrator interfacing with the first or second network manager, and a second network administrator interfacing with the third network manager, to review in order to assess whether any issue needs resolution before the migration, said collected information provided to the first or second network manager for presentation to the first network administrator;
performing the migration after the first and second administrators have assessed the collected information and confirmed that no issue has been identified that would prevent the migration.

12. The non-transitory machine-readable medium of claim 11, wherein the first network administrator is an administrator of the second network manager.

13. The non-transitory machine-readable medium of claim 11, wherein the first network administrator is an administrator of the first network manager.

14. The non-transitory machine-readable medium of claim 11, wherein the set of instructions for collecting comprises sets of instructions for:
directing the second network administrator of the third network manager to initially assess whether any issue needs to be resolved before the migration;
after the second network administrator confirms that no issue has been identified, providing data from the collected information to the first or second manager to provide a presentation to the first network administrator to review, in order to assess whether any issue needs to be resolved before the migration.

15. The non-transitory machine-readable medium of claim 11, wherein the program further comprises a set of instructions for placing the network components that implement the first SD network in a maintenance mode that keeps the network components operational but prevents updates to the network components.

16. The non-transitory machine-readable medium of claim 15, wherein the set of instructions for placing the network components in maintenance mode comprises a set of instructions for placing any account of the first network manager that is associated with the first SD network in maintenance mode.

17. The non-transitory machine-readable medium of claim 16, wherein the program further comprises a set of instructions for placing any account of the second network manager that is associated with the second SD network in maintenance mode to ensure that only a migration program responsible for migrating the first SD network to the second SD network is allowed to deploy network components for the second SD network during the migration.

18. The non-transitory machine-readable medium of claim 17, wherein the third network manager allows one or more logical network components to be specified, and the first and second network managers configure physical network components to implement the logical network components.

19. The non-transitory machine-readable medium of claim 17, wherein the third network manager allows one or more logical network components to be specified, and the first and second network managers initially define other logical network components to implement the logical network components specified by the third network manager and then configure physical network components to implement the logical network components that they respectively define.

20. The non-transitory machine-readable medium of claim 17, wherein the program further comprises a set of instructions for removing the accounts from maintenance mode after the migration of the first SD network to the second SD network has been completed.

\* \* \* \* \*